United States Patent
Bae et al.

(10) Patent No.: US 10,989,959 B2
(45) Date of Patent: Apr. 27, 2021

(54) BACKLIGHT UNIT, DISPLAY DEVICE INCLUDING THE SAME, AND MANUFACTURING METHOD THEREOF

(71) Applicant: Samsung Display Co., Ltd., Yongin-si (KR)

(72) Inventors: Kwang Soo Bae, Yongin-si (KR); Beom Soo Park, Yongin-si (KR); Min Jeong Oh, Yongin-si (KR); Young Je Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/816,174

(22) Filed: Mar. 11, 2020

(65) Prior Publication Data

US 2020/0387029 A1 Dec. 10, 2020

(30) Foreign Application Priority Data

Jun. 5, 2019 (KR) .......................... 10-2019-0066842

(51) Int. Cl.
*G02F 1/13357* (2006.01)
*G02F 1/1335* (2006.01)

(52) U.S. Cl.
CPC .. *G02F 1/133603* (2013.01); *G02F 1/133614* (2021.01)

(58) Field of Classification Search
None
See application file for complete search history.

(56) References Cited

U.S. PATENT DOCUMENTS

| | | | |
|---|---|---|---|
| 8,299,473 B1 * | 10/2012 | D'Evelyn | H01L 33/32 257/79 |
| 9,964,802 B2 | 5/2018 | Chang | |
| RE47,711 E * | 11/2019 | Raring | H01L 33/502 |
| 2020/0264461 A1 * | 8/2020 | Kuwana | G02B 5/20 |

* cited by examiner

*Primary Examiner* — Ashok Patel
(74) *Attorney, Agent, or Firm* — Lewis Roca Rothgerber Christie LLP

(57) ABSTRACT

A backlight unit includes a first substrate, a plurality of LED chips on one surface of the first substrate and configured to emit light of a first color, a second substrate located opposite to the one surface of the first substrate, and a plurality of light modulation patterns on one surface of the second substrate facing the one surface of the first substrate so as to overlap the plurality of LED chips, respectively. Each of the plurality of light modulation patterns includes a first wavelength conversion pattern that converts the light of the first color into light of a second color. The first wavelength conversion pattern includes a first wavelength conversion layer on the one surface of the second substrate, a first organic encapsulation layer on the first wavelength conversion layer, and a barrier structure covering the first wavelength conversion layer and the first organic encapsulation layer.

18 Claims, 14 Drawing Sheets

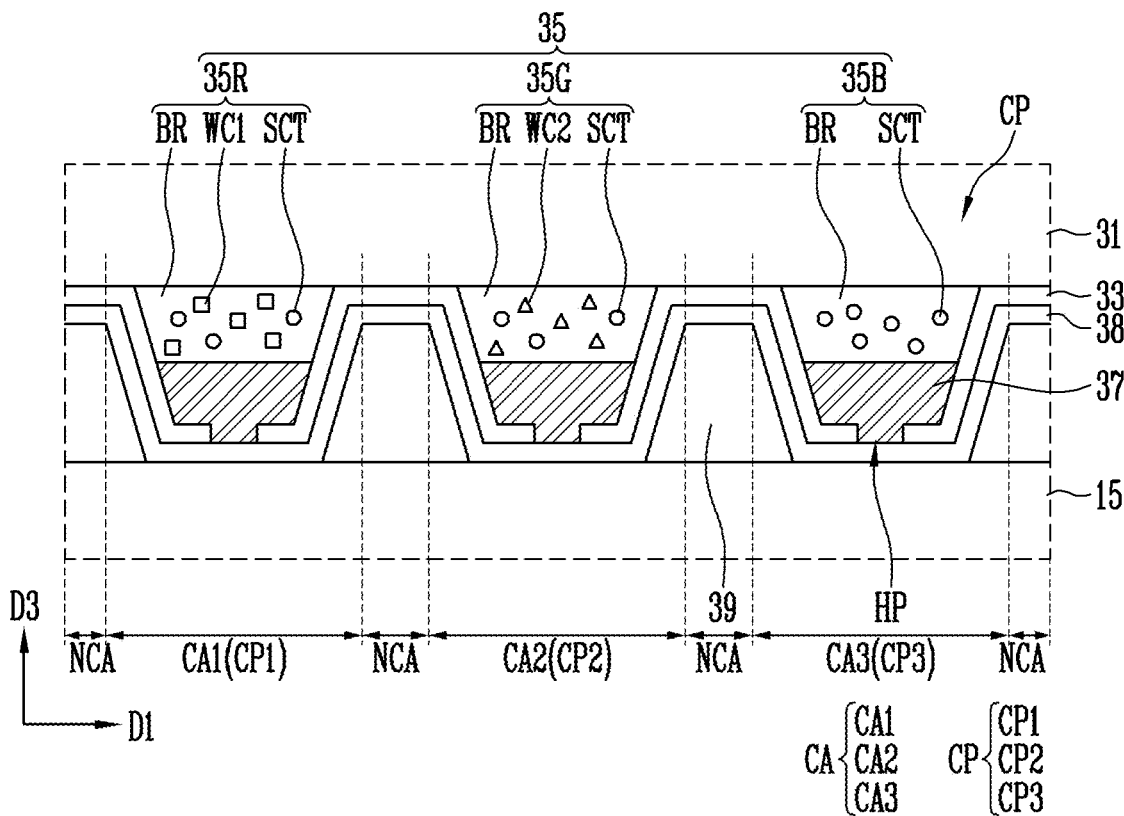
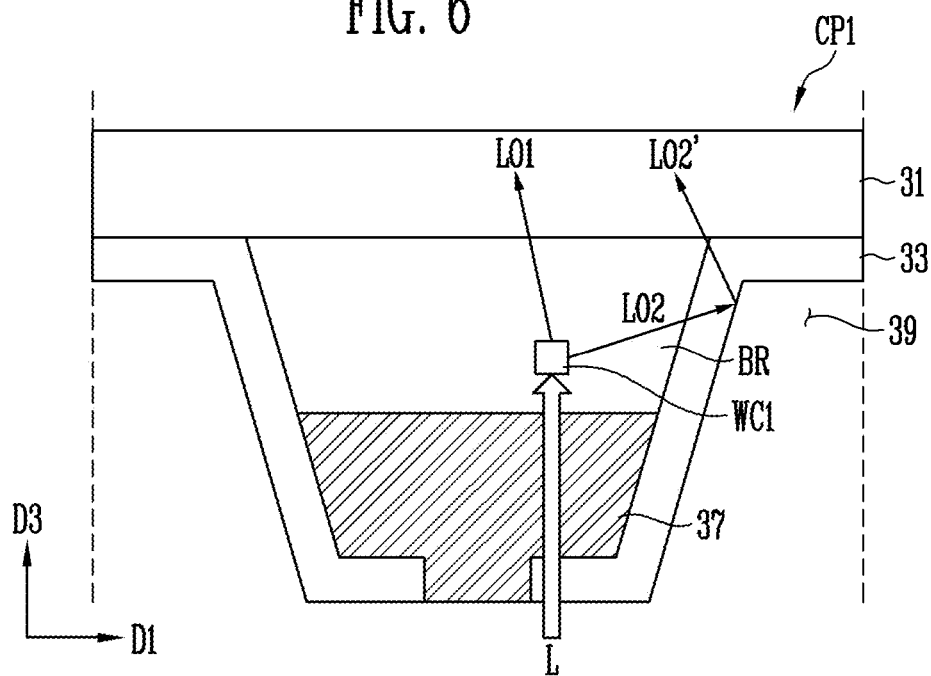

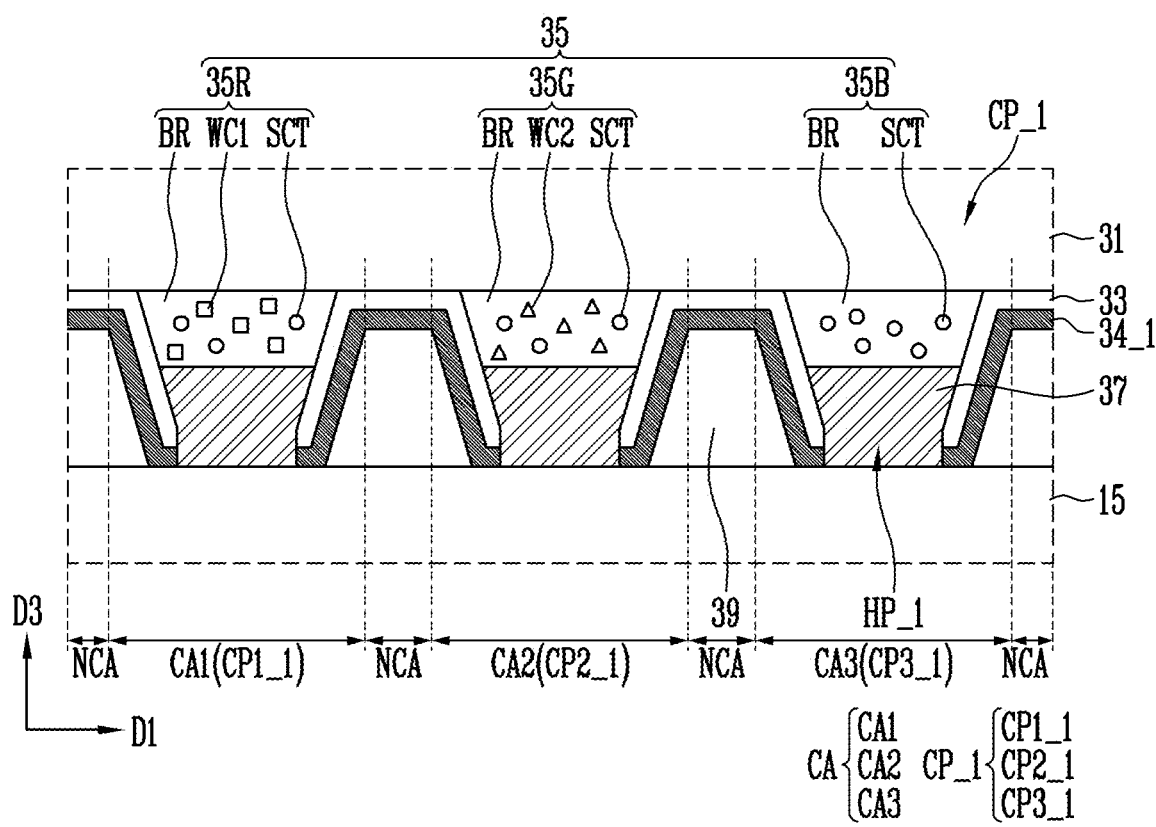

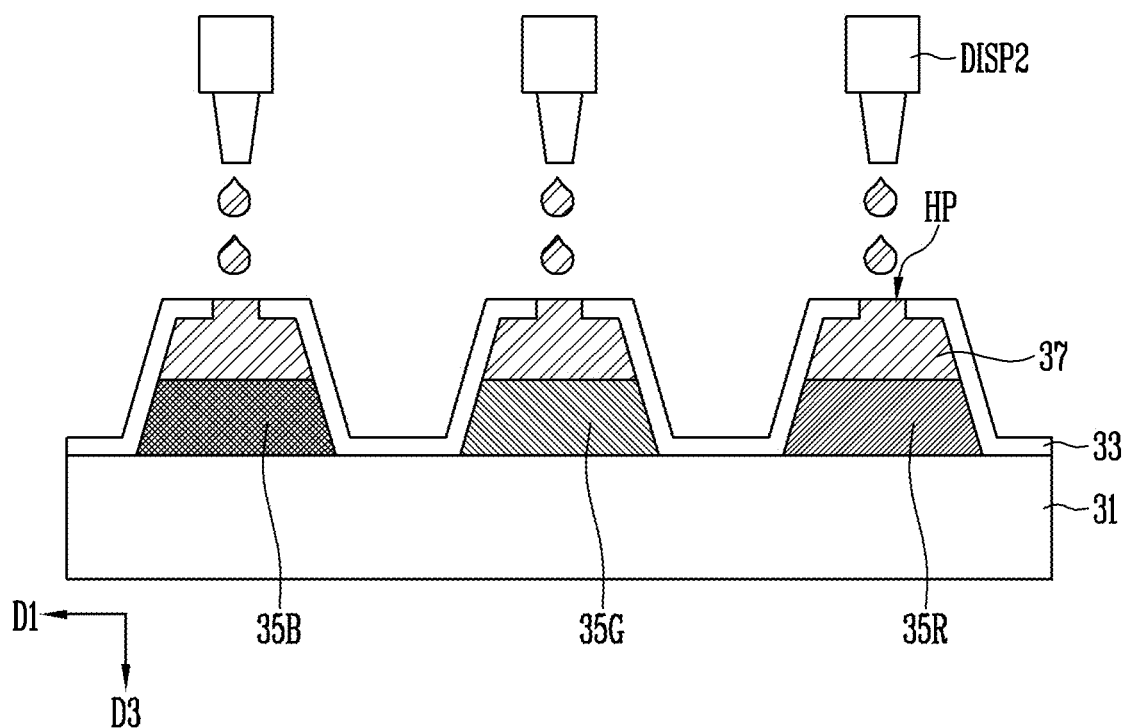

BACKLIGHT UNIT, DISPLAY DEVICE INCLUDING THE SAME, AND MANUFACTURING METHOD THEREOF

CROSS-REFERENCE TO RELATED APPLICATION

The application claims priority to and the benefit of Korean Patent Application No. 10-2019-0066842, filed on Jun. 5, 2019, the entire content of which is incorporated herein by reference for all purposes as if fully set forth herein.

BACKGROUND

1. Field

Embodiments of the present disclosure relate to a backlight unit, a display device including the same, and a manufacturing method thereof.

2. Discussion

With the development of multimedia, the importance of display devices is increasing. Various display devices such as a liquid crystal display (LCD) device, an organic light emitting diode (OLED) display device, and the like have been developed in response to this.

The liquid crystal display device itself is not designed to emit light. The liquid crystal display device is composed of a light-receiving element that displays an image by adjusting the transmittance of light provided from the outside. Therefore, the liquid crystal display device utilizes a separate device for providing light to a liquid crystal panel such as, for example, a backlight unit.

In recent years, a light emitting diode (LED) has been spotlighted as a light source of a backlight unit of a liquid crystal display device. LEDs are widely used as backlight units for liquid crystal display devices due to their long lifetime, low power consumption, fast response speed, and excellent initial driving characteristics, and their application fields are becoming wider.

SUMMARY

Embodiments of the present disclosure provide a backlight unit including a color conversion substrate in which a wavelength conversion material is formed at a desired position by a barrier structure, a display device including the same, and a manufacturing method thereof.

However, embodiments of the present disclosure are not limited to the above-mentioned embodiments, and embodiments not mentioned may be clearly understood by those skilled in the art from the description herein below.

According to an embodiment of the present disclosure, a backlight unit may include a first substrate; a plurality of LED chips on one surface of the first substrate and configured to emit light of a first color; a second substrate located opposite to the one surface of the first substrate; and a plurality of light modulation patterns on one surface of the second substrate facing the one surface of the first substrate so as to overlap the plurality of LED chips, respectively. Each of the plurality of light modulation patterns may include a first wavelength conversion pattern that converts the light of the first color into light of a second color, the first wavelength conversion pattern may include a first wavelength conversion layer on the one surface of the second substrate, a first organic encapsulation layer on the first wavelength conversion layer, and a barrier structure covering the first wavelength conversion layer and the first organic encapsulation layer. The barrier structure may include a first hole pattern that exposes at least a portion of the first organic encapsulation layer.

Each of the plurality of light modulation patterns may further include a second wavelength conversion pattern that converts the light of the first color into light of a third color and is spaced apart from the first wavelength conversion pattern. The second wavelength conversion pattern may include a second wavelength conversion layer on the one surface of the second substrate, a second organic encapsulation layer on the second wavelength conversion layer, and the barrier structure covering the second wavelength conversion layer and the second organic encapsulation layer. The barrier structure may include the first hole pattern that exposes at least a portion of the second organic encapsulation layer.

The first wavelength conversion layer may include first wavelength conversion particles, the second wavelength conversion layer may include second wavelength conversion particles, and the first wavelength conversion particles and the second wavelength conversion particles may be quantum dots.

Each of the plurality of light modulation patterns may further include a light transmission pattern spaced apart from the first wavelength conversion pattern and the second wavelength conversion pattern. The light transmission pattern may include a light transmission layer on the one surface of the second substrate, a third organic encapsulation layer on the light transmission layer, and the barrier structure covering the light transmission layer and the third organic encapsulation layer. The barrier structure may include the first hole pattern that exposes at least a portion of the third organic encapsulation layer. The light transmission layer may include a base resin and scattering particles dispersed in the base resin.

At least one selected from the first wavelength conversion layer and the second wavelength conversion layer may further include the scattering particles.

Each of the plurality of light modulation patterns may further include an air layer between the first wavelength conversion pattern and the second wavelength conversion pattern.

Each of the plurality of light modulation patterns may further include a metal layer covering the barrier structure, and the first hole pattern may continuously penetrate the barrier structure and the metal layer to expose at least a portion of the first organic encapsulation layer.

Each of the barrier structure and the metal layer may include a second hole pattern that exposes at least a portion of the one surface of the second substrate and a light transmission pattern between the first wavelength conversion pattern and the second wavelength conversion pattern. The light transmission pattern may include a base resin and scattering particles dispersed in the base resin, and contact at least a portion of the plurality of LED chips and the one surface of the second substrate exposed through the second hole pattern.

The backlight unit may further comprise a light transmission pattern between the first wavelength conversion pattern and the second wavelength conversion pattern and between the barrier structure and each of the plurality of LED chips. The light transmission pattern may include a base resin and scattering particles dispersed in the base resin.

The barrier structure may include a first surface, a second surface and a third surface integrally connected (e.g., integrally coupled). The first surface may contact the one surface of the second substrate, the second surface may surround a side surface of the first wavelength conversion layer and a side surface of the first organic encapsulation layer, and the third surface may include the first hole pattern.

The barrier structure may include at least one selected from silicon nitride (SiNx), silicon oxide (SiOx), and silicon oxynitride (SiOxNy).

An obtuse angle formed by the one surface of the second substrate with the second surface of the barrier structure may be less than 120 degrees.

The first wavelength conversion layer may include first wavelength conversion particles that convert the light of the first color into red light and second wavelength conversion particles that convert the light of the first color into green light.

At least a portion of the first organic encapsulation layer may be in contact with each of the plurality of LED chips.

A gap that overlaps with the first hole pattern may be formed between the first organic encapsulation layer and each of the plurality of LED chips.

The backlight unit may further comprise at least one selected from a first passivation layer on the first substrate and covering the plurality of LED chips and a second passivation layer on the second substrate and covering the plurality of light modulation patterns.

According to another embodiment of the present disclosure, a display device may include a backlight unit; a display panel on the backlight unit; and an optical film between the backlight unit and the display panel. The backlight unit may comprise a first substrate; a plurality of LED chips on one surface of the first substrate and configured to emit light of a first color; a second substrate located opposite to the one surface of the first substrate; and a plurality of light modulation patterns on one surface of the second substrate facing the one surface of the first substrate so as to overlap the plurality of LED chips, respectively. Each of the plurality of light modulation patterns may include a first wavelength conversion pattern that converts the light of the first color into light of a second color. The first wavelength conversion pattern may include a first wavelength conversion layer on the one surface of the second substrate, a first organic encapsulation layer on the first wavelength conversion layer, and a barrier structure covering the first wavelength conversion layer and the first organic encapsulation layer. The barrier structure may include a hole pattern that exposes at least a portion of the first organic encapsulation layer.

Each of the plurality of light modulation patterns may include a second wavelength conversion pattern that converts the light of the first color into light of a third color and is spaced apart from the first wavelength conversion pattern. The second wavelength conversion pattern may include a second wavelength conversion layer on the one surface of the second substrate, a second organic encapsulation layer on the second wavelength conversion layer, and the barrier structure covering the second wavelength conversion layer and the second organic encapsulation layer. The barrier structure may include the hole pattern that exposes at least a portion of the second organic encapsulation layer. The first wavelength conversion layer may include first wavelength conversion particles, the second wavelength conversion layer may include second wavelength conversion particles, and the first wavelength conversion particles and the second wavelength conversion particles may be quantum dots.

According to another embodiment of the present disclosure, a manufacturing method of a backlight unit may include forming a first photoresist on one surface of a first substrate and patterning the first photoresist to form a first base pattern; forming an inorganic material layer covering the first substrate and the first base pattern;

forming a second photoresist on the inorganic material layer and patterning the second photoresist to form a second base pattern; forming a hole pattern in the inorganic material layer by an etching process using the second base pattern as a mask; removing the first base pattern and the second base pattern to form a barrier structure; forming a light modulation layer between the first substrate and the barrier structure through the hole pattern; and forming an organic encapsulation layer between the light modulation layer and the barrier structure through the hole pattern.

A first mask used to form the first base pattern may include a first light transmission region and a second mask used to form the second base pattern may include a second light transmission region. The first light transmission region and the second light transmission region may not be overlapped with each other, and the second light transmission region may be at least partially overlapped with the first base pattern.

BRIEF DESCRIPTION OF THE DRAWINGS

The accompanying drawings, which are included to provide a further understanding of the subject matter of the present disclosure, and are incorporated in and constitute a part of this specification, illustrate exemplary embodiments of the present disclosure, and, together with the description, serve to explain principles of the present disclosure.

FIGS. 5B and 5C are enlarged cross-sectional views for explaining modifications of the structure shown in FIG. 5A.

FIG. 6 is a cross-sectional view for explaining a path of light incident on a light modulation pattern.

FIGS. 7 to 10 are enlarged cross-sectional views of a backlight unit according to various embodiments, in which a light modulation pattern of the backlight unit is mainly expanded.

FIGS. 11A to 11G are cross-sectional views illustrating a manufacturing method of a backlight unit according to an embodiment, in which a manufacturing method of a color conversion substrate of the backlight unit is mainly shown.

DETAILED DESCRIPTION

Figure 1:
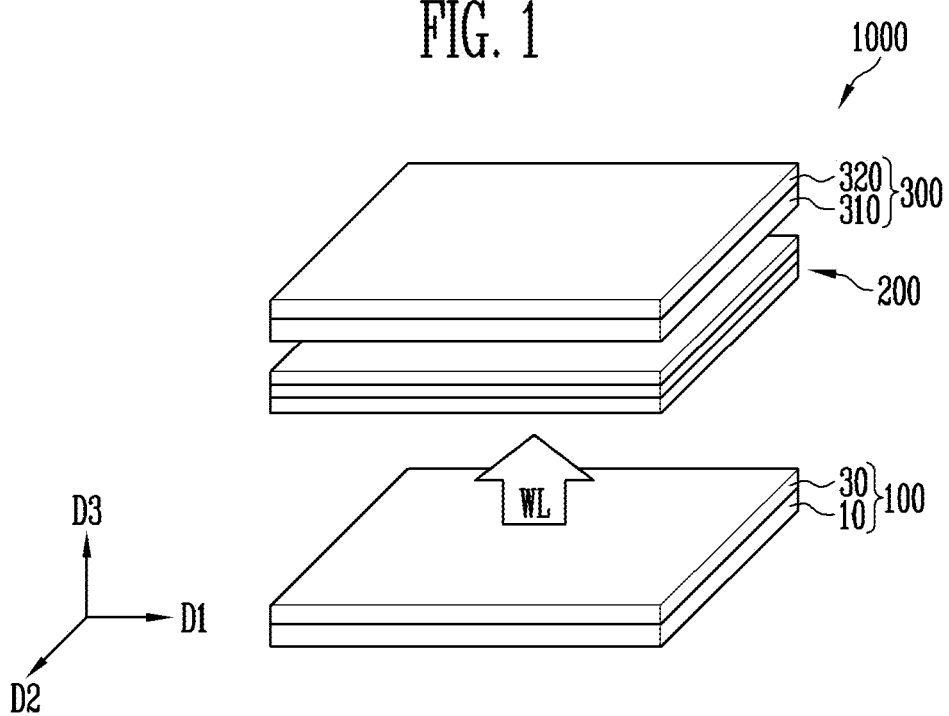
FIG. 1 is an exploded perspective view of a display device according to an embodiment.

The effects and characteristics of embodiments of the present disclosure and a method of achieving the effects and characteristics will be clear by referring to the embodiments described herein below in more detail together with the accompanying drawings. However, the present disclosure is not limited to the embodiments disclosed herein but may be implemented in various forms. The embodiments are provided by way of example only so that a person of ordinary skilled in the art can fully understand the features in the present disclosure and the scope thereof. Therefore, the present disclosure can be defined by the scope of the appended claims, and equivalents thereof.

The term "on" that is used herein to designate that an element or layer is on another element or layer includes both a case where an element or layer is located directly on another element or layer, and a case where an element or layer is located on another element or layer via still another element layer.

Although the terms "first," "second," and the like are used for describing various components, these components are not confined by these terms. These terms are merely used for distinguishing one component from the other components. Therefore, a first component may be a second component or vice versa according to the technical concepts of the present disclosure. The singular forms "a", "an" and "the" include plural referents unless the context clearly dictates otherwise.

Hereinafter, exemplary embodiments will be described with reference to the accompanying drawings. The same or similar reference numerals are used for the same components in the drawings.

Figure 2:
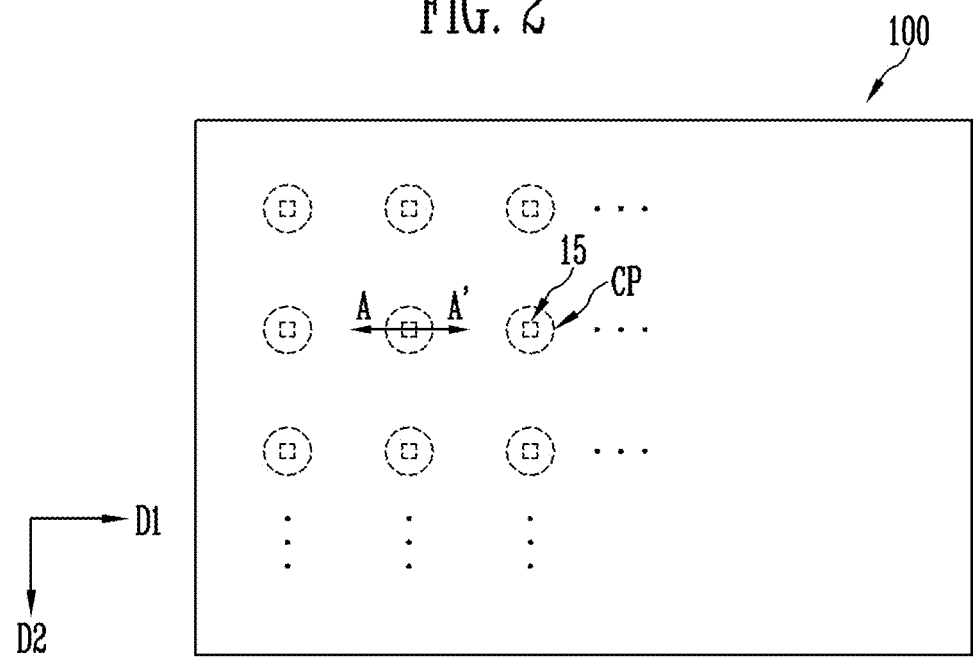
FIG. 2 is a plan view of a backlight unit according to an embodiment.
Figure 3A:
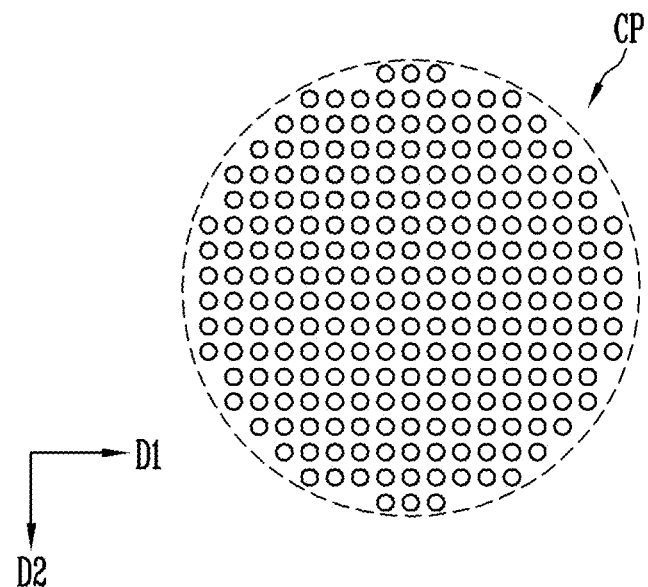
FIGS. 3A and 3B are schematic plan views of a light modulation pattern shown in FIG. 2.
Figure 3B:
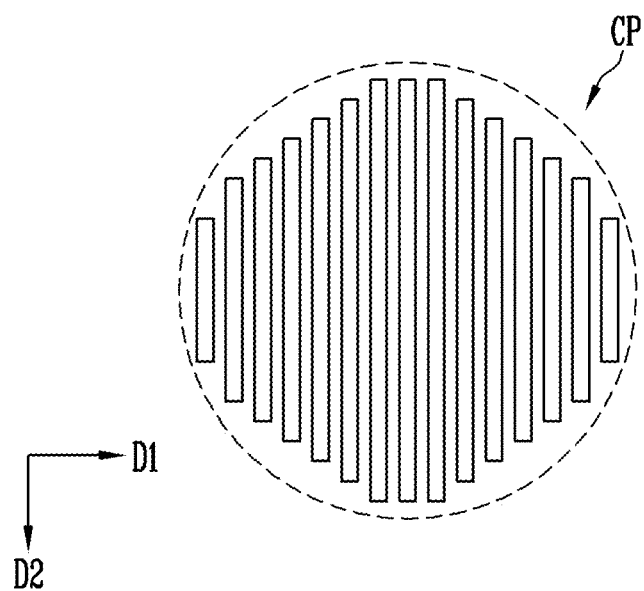
Figure 4A:
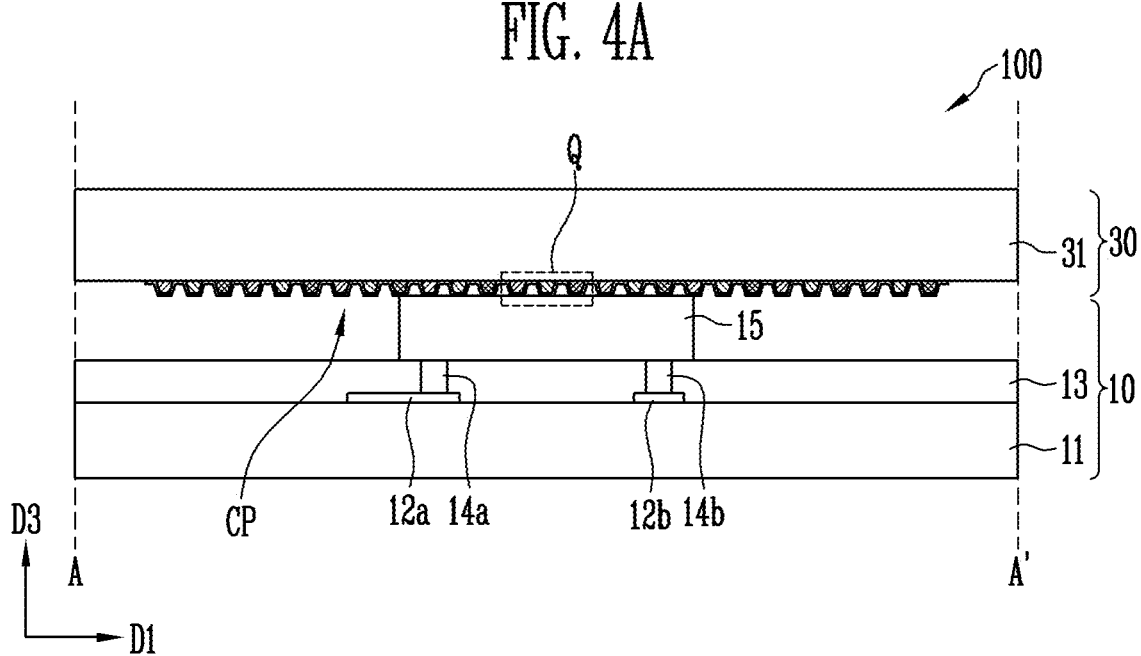
FIGS. 4A and 4B are cross-sectional views taken along the line A-A' in FIG. 2 for explaining examples.
Figure 4B:
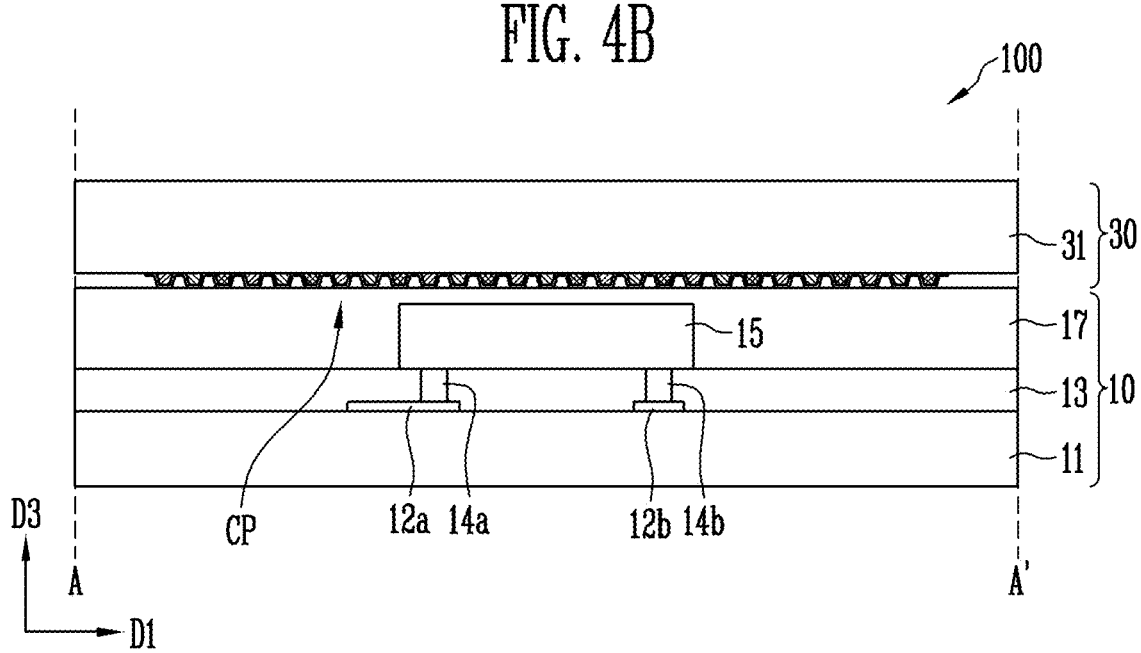

FIG. 1 is an exploded perspective view of a display device according to an embodiment. FIG. 2 is a plan view of a backlight unit according to an embodiment. FIGS. 3A and 3B are schematic plan views of a light modulation pattern shown in FIG. 2. FIGS. 4A and 4B are cross-sectional views taken along the line A-A' in FIG. 2 for explaining examples.

Referring to FIGS. 1, 2, 3A, 3B, 4A and 4B, a display device 1000 may include a backlight unit 100 and a display panel 300 on an upper portion of the backlight unit 100. The display device 1000 may further include an optical film 200 between the backlight unit 100 and the display panel 300.

The backlight unit 100 may be below the display panel 300 and the optical film 200. The backlight unit 100 may provide light WL toward the optical film 200 and the optical film 200 may provide the light toward the display panel 300. For example, the display panel 300 may display an image by receiving the light from the backlight unit 100 and the optical film 200.

The backlight unit 100 may include a light source substrate 10 and a color conversion substrate 30 on the light source substrate 10.

The light source substrate 10 may include a plurality of LED chips 15. As shown in FIG. 4A, the light source substrate 10 may include a first base substrate 11, a first electrode 12a and a second electrode 12b, an insulating film 13, and the plurality of LED chips 15.

The first base substrate 11 may provide a space for arranging various configurations of the light source substrate 10. The first base substrate 11 may generally have a polygonal columnar shape and may include upper and lower surfaces that are parallel (e.g., substantially parallel) to each other. In an embodiment, the first base substrate 11 may be a glass substrate. However, the material of the first base substrate 11 is not limited thereto.

The first electrode 12a and the second electrode 12b may be on the first base substrate 11. The first electrode 12a and the second electrode 12b may be electrically coupled to an external circuit to receive an electric signal and may be respectively coupled to each of the LED chips 15 to provide the electric signal. The first electrode 12a and the second electrode 12b may include a metal material such as gold (Au), silver (Ag), copper (Cu), and/or the like and may include a transparent conductive material such as ITO, IZO and ITZO.

The insulating film 13 may be on the first electrode 12a and the second electrode 12b. The insulating film 13 may be a single film made of an organic material or an inorganic material, or may be multiple films in which an organic film and an inorganic film are alternately laminated.

The insulating film 13 may compensate for a step generated on the first base substrate 11 due to the first electrode 12a and the second electrode 12b so that the LED chips 15 may be stably arranged. In addition, the insulating film 13 may include a plurality of through holes. A first connection electrode 14a and a second connection electrode 14b may be formed in the through holes of the insulating film 13 to couple the first electrode 12a and the second electrode 12b and the LED chips 15 to each other.

The plurality of LED chips 15 may be on the insulating film 13. As shown in FIG. 2, the LED chips 15 may be arranged in a matrix form in rows and columns on a plane. The intervals between the LED chips 15 may be constant. For example, the LED chips 15 may be evenly on the entire (e.g., substantially the entire) light source substrate 10. The LED chips 15 may have a rectangular or square planar shape, but may also have various suitable planar shapes such as, for example, a polygonal or circular shape.

As described herein above, each of the LED chips 15 may be electrically coupled to the first electrode 12a and the second electrode 12b, and may or may not emit light depending on a signal provided from the first electrode 12a and the second electrode 12b.

The LED chips 15 of the light source substrate 10 may be configured to emit light of the same (e.g., substantially the same) color (or wavelength). In an embodiment, each of the LED chips 15 may be a blue LED chip configured to emit blue light. In another embodiment, each of the LED chips 15 may be a UV (Ultra Violet) LED chip configured to emit ultraviolet rays. However, the present disclosure is not limited thereto, and the LED chips 15 may emit light of different colors.

In some embodiments, the light source substrate 10 may further include a first passivation layer 17 on the LED chips 15 as shown in FIG. 4B. The first passivation layer 17 may include an organic insulating layer made of an organic material or an inorganic insulating layer made of an inorganic material. In addition, the first passivation layer 17 may include a material having a high light transmittance.

The first passivation layer 17 may entirely (e.g., substantially entirely) cover the LED chips 15 on the first base substrate 11 and prevent the LED chips 15 from being deteriorated due to oxygen or water penetrated from outside (or reduce a likelihood or amount of such deterioration). The first passivation layer 17 may entirely (e.g., substantially entirely) flatten the upper surface of the light source substrate 10 so that the light source substrate 10 may be stably coupled to the color conversion substrate 30 to be described herein below.

According to some embodiments, the light source substrate 10 may further include a reflection plate. The reflection plate may reflect light, which is not directed upward (for example, a third direction D3) from the light emitted from the LED chips 15, to the upper side. For example, the reflection plate may improve the light extraction efficiency of the light source substrate 10. The reflection plate may be attached to an upper surface of the first base substrate 11 so as not to overlap the LED chips 15. When the first base substrate 11 has translucency, the reflection plate may be attached to the entire (e.g., substantially the entire) lower surface of the first base substrate 11.

The color conversion substrate 30 may be on the light source substrate 10. The color conversion substrate 30 may include a second base substrate 31 and light modulation patterns CP formed on one surface of the second base substrate 31.

The second base substrate 31 may be located opposite to the first base substrate 11. The second base substrate 31 may provide a space for arranging the light modulation patterns CP.

The second base substrate 31, like the first base substrate 11, may generally have a polygonal columnar shape and may include upper and lower surfaces that are parallel (e.g., substantially parallel) to each other. In an embodiment, the second base substrate 31 may be a glass substrate, but is not limited to a substrate having a high light transmittance.

The color conversion substrate 30 may include a plurality of light modulation patterns CP to convert the color of light provided from the LED chips 15. Each of the plurality of light modulation patterns CP may include a plurality of patterns. For example, the light modulation patterns CP may include wavelength conversion patterns and light transmission patterns to be described herein below.

The light modulation patterns CP may be formed on one surface of the second base substrate 31 and may be formed on a lower surface of the second base substrate 31, for example, as shown in FIG. 4A. The light modulation patterns CP formed on the lower surface of the second base substrate 31 may face the LED chips 15 of the light source substrate 10. When the light modulation patterns CP and the LED chips 15 are adjacent to and facing each other, the light incident efficiency from the LED chips 15 to the light modulation patterns CP can be increased.

The light modulation patterns CP may be arranged in a matrix form in rows and columns on the lower surface of the second base substrate 31 and may be spaced apart from each other at the same (e.g., substantially the same) intervals as the LED chips 15.

At least a portion of the light modulation patterns CP of the color conversion substrate 30 may overlap the LED chips 15. The area of each of the light modulation patterns CP may be larger than that of each of the LED chips 15. For example, when the light modulation patterns CP and the LED chips 15 overlap with each other, the light modulation patterns CP may include the LED chips 15 when viewed in a plan.

In some embodiments, when the area of the light modulation patterns CP is wider than that of the LED chips 15, light emitted from the LED chips 15 in a first direction D1 and the third direction D3 may also be incident into the light modulation patterns CP due to the Lambertian emission characteristics of the LED chips 15. Therefore, light incident efficiency from the LED chips 15 to the light modulation patterns CP can be increased.

Each of the light modulation patterns CP may be composed of a plurality of patterns, as shown in FIGS. 3A and 3B. FIG. 3A shows dot-shaped light modulation patterns CP arranged so as to be spaced apart from each other by a set or predetermined distance in the first direction D1 and a second direction D2 on a plane. FIG. 3B shows stripe-shaped light modulation patterns CP spaced at regular intervals in the first direction D1 and extending along the second direction D2 on a plane. The light modulation patterns CP may be spaced apart from each other by the same (e.g., substantially the same) distance, but may be spaced apart at different distances as needed. For example, in the light modulation patterns CP, the spacing distance may be reduced to increase the density of the patterns located in a center portion and the spacing distance may be increased to lower the density of the patterns located in an edge portion.

Each of the structures shown in FIGS. 3A and 3B may be applied to any suitable embodiments of the present disclosure. Hereinafter, the dot-shaped light modulation patterns CP shown in FIG. 3A will be described as an example.

As shown in FIG. 4A, each of the light modulation patterns CP may have an inverted trapezoidal shape having an upper surface and a lower surface parallel (e.g., substantially parallel) to each other in which the upper surface is wider than the lower surface in a cross-sectional view. For example, each of the light modulation patterns CP may gradually become narrower toward the first base substrate 11 side from the second base substrate 31 side.

The light source substrate 10 and the color conversion substrate 30 may be coupled to each other to form a single structure. The LED chips 15 on the upper surface of the light source substrate 10 and the light modulation patterns CP on the lower surface of the color conversion substrate 30 may contact each other. In another embodiment, the LED chips 15 and the light modulation patterns CP may not be in contact with each other.

The color conversion substrate 30 may convert the color (or wavelength) of light provided from the light source substrate 10 and provide the color-converted light WL to the display panel 300. For example, the light provided to the color conversion substrate 30 from the light source substrate 10 may be blue light and the light WL provided from the color conversion substrate 30 to the display panel 300 may be white light. In some embodiments, the display panel 300 may receive the white light WL from the backlight unit 100 and provide an image to the user with the provided white light WL.

The optical film 200 may be between the backlight unit 100 and the display panel 300. The optical film 200 may be composed of a plurality of films. For example, the optical film 200 may include at least one selected from a prism film, a diffusion film, a micro-lens film, a lenticular film, a polarizing film, a reflective polarizing film, and a retardation film. An air layer may be formed between the plurality of films, but the present disclosure is not limited thereto. The plurality of films may be bonded to each other. The optical film 200 may be attached on one surface of either the backlight unit 100 or the display panel 300, but the present disclosure is not limited thereto. The optical film 200 may be spaced apart from each of the backlight unit 100 and the display panel 300.

The display panel 300 may be above the backlight unit 100 and the optical film 200. The display panel 300 may include a first display substrate 310, a second display substrate 320 facing the first display substrate 310, and a liquid crystal layer between the first display substrate 310 and the second display substrate 320. The first display substrate 310 and the second display substrate 320 may overlap each other. In some embodiments, one of the display substrates may be larger than the other display substrate and may protrude outward. A driving circuit chip or an external circuit display substrate may be mounted on the display substrate of such protruding area.

Hereinafter, the light modulation patterns CP of the color conversion substrate 30 will be described in more detail with reference to FIGS. 5A, 5B, 5C, and 6.

Figure 5A:
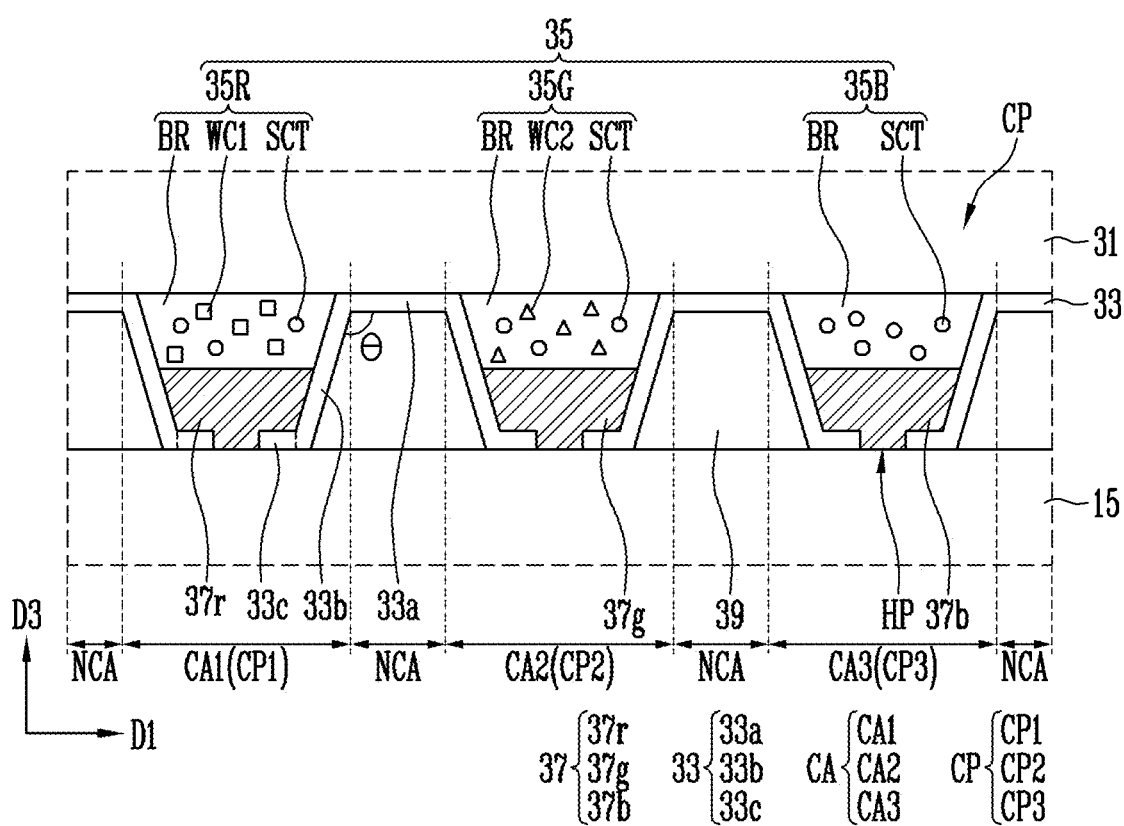
FIG. 5A is an enlarged cross-sectional view of the region Q of FIG. 4A.
Figure 5B:
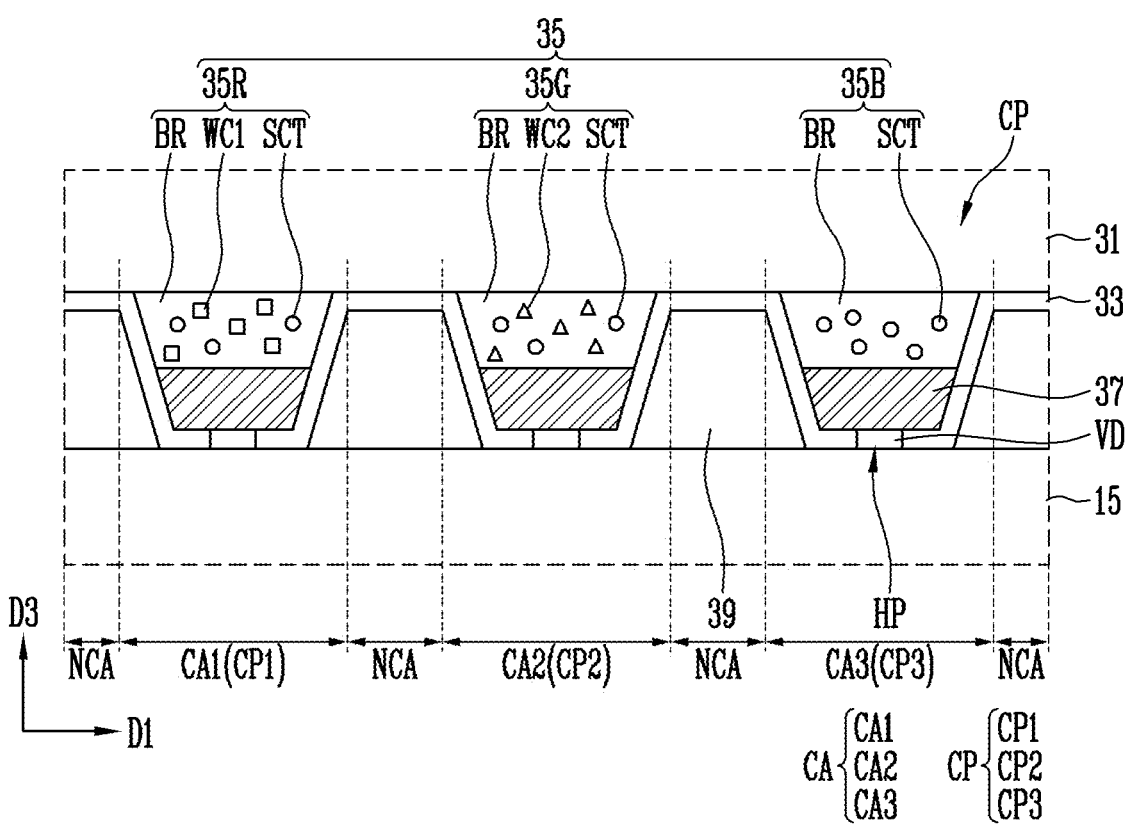

FIG. 5A is an enlarged cross-sectional view of the region Q of FIG. 4A. FIGS. 5B and 5C are enlarged cross-sectional views for explaining modifications of the structure shown in FIG. 5A. FIG. 6 is a cross-sectional view for explaining a path of light incident on a light modulation pattern.

Referring to FIGS. 5A, 5B, 5C, and 6, the light modulation patterns CP may include a first wavelength conversion pattern CP1, a second wavelength conversion pattern CP2, and a light transmission pattern CP3. Each of the light modulation patterns CP may be composed of a barrier structure 33, a light modulation layer 35, and an organic encapsulation layer 37.

The second base substrate 31 may be divided into a modulation area CA and a non-modulation area NCA. The modulation area CA may be an area in which the light modulation patterns CP are located. For example, the modulation area CA may include a first modulation area CA1 in which the first wavelength conversion pattern CP1 is located, a second modulation area CA2 in which the second wavelength conversion pattern CP2 is arranged, and a third modulation area CA3 in which the light transmission pattern CP3 is located. The non-modulation area NCA may be an area not including the light modulation patterns CP. For example, the non-modulation area NCA may be a region between the first modulation area CA1 and the second modulation area CA2 or a region between the second modulation area CA2 and the third modulation area CA3.

The barrier structure 33 may be a structure covering the light modulation layer 35 and the organic encapsulation layer 37, which will be described herein below. The first wavelength conversion pattern CP1, the second wavelength conversion pattern CP2 and the light transmission pattern CP3 of the light modulation patterns CP may be separated from each other by the barrier structure 33.

The barrier structure 33 may be on the lower surface of the second base substrate 31. For example, the barrier structure 33 may be have a uniform (e.g., substantially uniform) thickness along the lower surface of the second base substrate 31, the side surface of the light modulation layer 35, and the side surface of the organic encapsulation layer 37. In an embodiment, the thickness of the barrier structure 33 may be 1 μm or less, but is not limited thereto.

The barrier structure 33 may be an inorganic film including an inorganic material. For example, the barrier structure 33 may be formed of any one selected from silicon nitride (SiNx), silicon oxide (SiOx), and silicon oxynitride (SiOxNy). In an embodiment, the barrier structure 33 may comprise an inorganic film including silicon nitride (SiNx). Herein, x and y may be real numbers greater than zero.

The barrier structure 33 may include a first surface 33a (or a first portion), a second surface 33b (or a second portion), and a third surface 33c (or a third portion). The first surface 33a, the second surface 33b, and the third surface 33c may be integrally coupled to each other. The first surface 33a of the barrier structure 33 may be formed in the non-modulation area NCA of the second base substrate 31. The second surface 33b and the third surface 33c of the barrier structure 33 may be formed in the modulation area CA of the second base substrate 31.

The first surface 33a of the barrier structure 33 may be a surface contacting the lower surface of the second base substrate 31.

The second surface 33b may be a side wall of the barrier structure 33 and may surround the sides of the light modulation layer 35 and the organic encapsulation layer 37. The shape of the light modulation layer 35 and the organic encapsulation layer 37 formed in an inner space of the barrier structure 33 may be determined according to the shape of the barrier structure 33.

The second surface 33b may form a certain angle θ with the first surface 33a. In an embodiment, the obtuse angle θ formed by the first surface 33a and the second surface 33b may be greater than 90 degrees and less than 120 degrees. The present disclosure is not limited thereto and the angle θ between the first surface 33a and the second surface 33b may be greater than 120 degrees according to the process of forming the barrier structure 33.

The third surface 33c may be a surface supporting at least a portion of the organic encapsulation layer 37. The third surface 33c in each modulation area CA may include a hole pattern HP. The hole pattern HP may be a hole through which the forming material is injected into the barrier structure 33 to form the light modulation layer 35 and the organic encapsulation layer 37.

The light modulation layer 35 may include a first wavelength conversion layer 35R, a second wavelength conversion layer 35G, and a light transmission layer 35B. The first wavelength conversion pattern CP1 may include the first wavelength conversion layer 35R located in the first modulation area CA1. The second wavelength conversion pattern CP2 may include the second wavelength conversion layer 35G located in the second modulation area CA2. The light transmission pattern CP3 may include the light transmission layer 35B located in the third modulation area CA3.

The light modulation layer 35 may be formed in a space surrounded by the second surface 33b of the barrier structure 33. As described herein above, the shape of the light modulation layer 35 may be determined according to the shape of the barrier structure 33.

Each of the first wavelength conversion layer 35R, the second wavelength conversion layer 35G and the light transmission layer 35B may include a base resin BR and various suitable particles dispersed in the base resin BR. For example, the first wavelength conversion layer 35R may include first wavelength conversion particles WC1 dispersed in the base resin BR, the second wavelength conversion layer 35G may include second wavelength conversion particles WC2 dispersed in the base resin BR, and the light transmission layer 35B may include scattering particles SCT dispersed in the base resin BR. The first wavelength conversion layer 35R and the second wavelength conversion layer 35G may further include scattering particles SCT dispersed in the base resin BR.

The base resin BR is not particularly limited as long as it has a high light transmittance and is excellent in dispersion characteristics for the first wavelength conversion particles WC1, the second wavelength conversion particles WC2 and the scattering particles SCT. For example, the base resin BR may include an organic material such as an epoxy resin, an acrylic resin, a cardo-based resin, and/or an imide resin.

The first wavelength conversion particles WC1 of the first wavelength conversion layer 35R and the second wavelength conversion particles WC2 of the second wavelength conversion layer 35G may convert the peak wavelength of an incident light to another set or specific peak wavelength. For example, the first wavelength conversion particles WC1 and the second wavelength conversion particles WC2 may convert the color of the incident light.

For example, the first wavelength conversion particles WC1 may convert the blue light provided from the LED chips 15 into red light and the second wavelength conversion particles WC2 may convert the blue light provided from the LED chips 15 into green light. In some embodiments, the first modulation area CA1 in which the first wavelength conversion pattern CP1 is arranged is a region configured to emit red light and the second modulation area CA2 in which the second wavelength conversion pattern CP2 is arranged is a region configured to emit green light.

The first wavelength conversion particles WC1 and the second wavelength conversion particles WC2 may be, for example, a quantum dot, a quantum rod or a fluorescent substance. The quantum dot may be a particle-like material that emits light of a set or specific wavelength while electrons are transferred from a conduction band to a valence band.

The quantum dot may be a semiconductor nanocrystalline material. The quantum dot has a set or specific bandgap depending on its composition and size, and can absorb light and emit light having a set or specific wavelength. Examples of the semiconductor nanocrystals of the quantum dots include Group IV nanocrystals, Group II-VI compound nanocrystals, Group III-V compound nanocrystals, Group IV-VI nanocrystals, or combinations thereof.

For example, the Group IV nanocrystals may be exemplified by binary element compounds such as silicon (Si), germanium (Ge), silicon carbide (SiC), and silicon-germanium (SiGe), but the present disclosure is not limited thereto.

The Group II-VI compound nanocrystals may be exemplified by binary element compounds such as CdSe, CdTe, ZnS, ZnSe, ZnTe, ZnO, HgS, HgSe, HgTe, MgSe, MgS and mixtures thereof, ternary element compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof or quaternary element compounds such as HgZnTeS, CdZnSeS, CdZnSeTe, CdZnSTe, CdHgSeS, CdHgSeTe, CdHgSTe, HgZnSeS, HgZnSeTe, HgZnSTe and mixtures thereof, but the present disclosure is not limited thereto.

The Group III-V compound nanocrystals may be exemplified by binary element compounds such as GaN, GaP, GaAs, GaSb, AlN, AlP, AlAs, AlSb, InN, InP, InAs, InSb and mixtures thereof, ternary element compounds such as GaNP, GaNAs, GaNSb, GaPAs, GaPSb, AlNP, AlNAs, AlNSb, AlPAs, AlPSb, InGaP, InNP, InNAs, InNSb, InPAs, InPSb and mixtures thereof or quaternary element compounds such as GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures thereof, but the present disclosure is not limited thereto.

The Group IV-VI nanocrystals may be exemplified by binary element compounds such as SnS, SnSe, SnTe, PbS, PbSe, PbTe and mixtures thereof, ternary element compounds such as SnSeS, SnSeTe, SnSTe, PbSeS, PbSeTe, PbSTe, SnPbS, SnPbSe, SnPbTe and mixtures thereof or quaternary element compounds such as SnPbSSe, SnPbSeTe, SnPbSTe and mixtures thereof, but the present disclosure is not limited thereto.

The quantum dot is generally used in the art, and is not particularly limited to a set or specific shape. For example, the quantum dot may have a shape of spherical, pyramidal, multi-arm or cubic nanoparticles, nanotubes, nanowires, nano fibers, nano plate type particles (e.g., nano plate kind of particles), and/or the like. The binary elemental compounds, the ternary element compounds or the quaternary element compounds may be distributed at uniform (e.g., substantially uniform) concentrations in the particles or at different concentrations in the particles.

The quantum dot may have a core-shell structure comprising a core including the nanocrystals described herein above and a shell surrounding the core. The interface between the core and the shell may have a concentration gradient in which the concentration of the element present in the shell becomes lower toward the center. The shell of the quantum dot may serve as a passivation layer for preventing or reducing chemical denaturation of the core in order to maintain semiconductor properties and/or a charging layer for imparting electrophoretic characteristics to the quantum dot. The shell may be a single layer or multiple layers. Examples of the shell of the quantum dot may include metal or nonmetal oxide, a semiconductor compound, or a combination thereof.

For example, the metal or nonmetal oxide may be exemplified by binary element compounds such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, and the like or ternary element compounds such as $MgAl_2O_4$, $CoFe_2O_4$, $NiFe_2O_4$, $CoMn_2O_4$ and the like, but the present disclosure is not limited thereto.

The semiconductor compound may be exemplified by CdS, CdSe, CdTe, ZnS, ZnSe, ZnTe, ZnSeS, GaAs, GaP, GaSb, HgS, HgSe, HgTe, InAs, InP, InSb, AlAs, AlP, AlSb and the like, but the present disclosure is not limited thereto.

The light emitted by the quantum dot may have a full width of half maximum (FWHM) of about 45 nm or less, thereby improving the color purity and color reproducibility of the color displayed by the display device. Further, the light emitted by the quantum dots can be emitted toward various suitable directions regardless of the direction of the incident light. This can improve a lateral visibility of the display device.

The first wavelength conversion particles WC1 and the second wavelength conversion particles WC2 may all be formed of quantum dots. In this case, the diameter of the quantum dots constituting the first wavelength conversion particles WC1 may be larger than that of the quantum dots constituting the second wavelength conversion particles WC2. For example, the diameter of the quantum dots constituting the first wavelength conversion particles WC1 may be between about 55 Å and 65 Å and the diameter of the quantum dots constituting the second wavelength conversion particles WC2 may be between about 40 Å and 55 Å. However, the present disclosure is not limited thereto.

The light transmission layer 35B may include the scattering particles SCT. In addition, the first wavelength conversion layer 35R and the second wavelength conversion layer 35G may further include the scattering particles SCT.

The scattering particles SCT may have a refractive index different from that of the base resin BR and form an optical interface with the base resin BR. The material of the scattering particles SCT is not particularly limited as long as it is a material capable of scattering at least a part of the transmitted light, and examples thereof include metal oxide particles such as titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$).

The scattering particles SCT may scatter light in a random direction regardless of the direction of the incident light without substantially changing the wavelength of the light transmitted through the light transmission layer 35B. As a result, the lateral visibility of the display device can be improved.

The organic encapsulation layer 37 may be on one surface of the light modulation layer 35. For example, the organic encapsulation layer 37 may be on the lower surface of the light modulation layer 35. For example, the organic encapsulation layer 37 may include a first organic encapsulation layer 37r between the first wavelength conversion layer 35R and the LED chips 15, a second organic encapsulation layer 37g between the second wavelength conversion layer 35G and the LED chips 15, and a third organic encapsulation layer 37b between the light transmission layer 35B and the LED chips 15. The first organic encapsulation 37r, the second organic encapsulation 37g, and the third organic encapsulation layer 37b may be formed concurrently (e.g., simultaneously) by the same (e.g., substantially the same) process, but the present disclosure is not limited thereto.

The organic encapsulation layer 37 may prevent the heat generated from the LED chips 15 from being transmitted to the light modulation layer 35 (or reduce a likelihood or amount of such heat transmission). For example, the organic encapsulation layer 37 may prevent the first and second wavelength conversion particles WC1 and WC2 in the light modulation layer 35 from deteriorating due to heat generated in the LED chips 15 (or may reduce a likelihood or amount of such deterioration). Therefore, the organic encapsulation layer 37 is not limited as long as it includes an organic material having a low thermal conductivity.

The organic encapsulation layer 37 may be filled in the space formed by the barrier structure 33. For example, the space surrounded by the second surface 33b of the barrier structure 33 may be filled with the light modulation layer 35 and the organic encapsulation layer 37.

The organic encapsulation layer 37 may also be filled in the hole pattern HP of the barrier structure 33. In this case, at least a portion of the organic encapsulation layer 37 may contact the LED chips 15.

In some embodiments, as shown in FIG. 5B, the organic encapsulation layer 37 may not be filled in the hole pattern HP of the barrier structure 33. For example, the organic encapsulation layer 37 may not be in contact with the LED chips 15. A void VD may be formed in the hole pattern HP that is not filled with the organic encapsulation layer 37. The void VD may be formed between the organic encapsulation layer 37 and the LED chips 15.

In another embodiment, the light modulation patterns CP may further include a second passivation layer 38 under the barrier structure 33, as shown in FIG. 5C. The second passivation layer 38 may be entirely (e.g., substantially entirely) on the second base substrate 31 and may cover the barrier structure 33. The second passivation layer 38 may include an inorganic film made of an inorganic material. The second passivation layer 38 may comprise a material having a high light transmittance. For example, the second passivation layer 38 may comprise any one selected from silicon nitride (SiNx), silicon oxide (SiOx), and silicon oxynitride (SiOxNy). Herein, x and y may be real numbers greater than zero.

The second passivation layer 38 may effectively block oxygen or moisture from penetrating into the light modulation layer 35 through the hole pattern HP of the barrier structure 33. In addition, the second passivation layer 38 may prevent the first and second wavelength conversion particles WC1 and WC2 in the light modulation layer 35 from deteriorating (or may reduce a likelihood or amount of such deterioration).

An air layer 39 may be formed between the first wavelength conversion pattern CP1, the second wavelength conversion pattern CP2, and the light transmission pattern CP3. The light directed toward the air layer 39 from the inside of each of the first wavelength conversion pattern CP1, the second wavelength conversion pattern CP2, and the light transmission pattern CP3 may be totally (e.g., substantially totally) reflected by the air layer 39 and directed upward.

For example, as shown in FIG. 6, the blue light L incident on the first wavelength conversion pattern CP1 may be converted into red light (e.g., first emission light LO1 and second emission light LO2) by the first wavelength conversion particles WC1 and be emitted toward different directions. The light emitted in the random direction by the first wavelength conversion particles WC1 may include first emission light LO1 directed upward and second emission light LO2 directed toward the side. The first emission light LO1 may be emitted upward (for example, the third direction D3) and proceed toward the display panel 300 (refer to FIG. 1) while the second emission light LO2 may travel toward the side (for example, the first direction D1) facing the air layer 39.

The refractive index of the air layer 39 may be 1 (one) or a value similar thereto and the refractive indexes of the base resin BR and the barrier structure 33 may be larger than that of the air layer 39. For example, the air layer 39 and the barrier structure 33 may have refractive indexes different from each other and form an optical interface. The second emission light LO2 directed toward the air layer 39 may be totally (e.g., substantially totally) reflected at the boundary between the air layer 39 and the barrier structure 33 and the reflected second emission light LO2' may travel upward. Therefore, the air layer 39 formed between the first wavelength conversion pattern CP1, the second wavelength conversion pattern CP2, and the light transmission pattern CP3 may improve the light extraction efficiency of the backlight unit.

As described herein above, each of the LED chips 15 may provide blue light to each of the light modulation patterns CP in the color conversion substrate 30. The blue light incident on the first wavelength conversion pattern CP1 of the light modulation patterns CP may be converted into red light and emitted to the outside, the blue light incident on the second wavelength conversion pattern CP2 of the light modulation patterns CP may be converted into green light and emitted to the outside, and the blue light incident on the light transmission pattern CP3 of the light modulation patterns CP may be scattered by the scattering particles SCT of the light transmission pattern CP3 and emitted to the outside. For example, light emitted through the color conversion substrate 30 may be white light WL (refer to FIG. 1) including red light, green light, and blue light.

FIGS. 7 to 10 are enlarged cross-sectional views of a backlight unit according to various embodiments. Hereinafter, other embodiments of a backlight unit will be described. In the following embodiments, the same components as those of the previously described embodiments will be referred to by the same reference numerals, the description thereof will be omitted or simplified, and differences will be mainly described.

The embodiment of FIG. 7 differs from the embodiment of FIG. 5A in that a metal layer 34_1 is further on the barrier structure 33.

Referring to FIGS. 5A and 7, light modulation patterns CP_1 may further include the metal layer 34_1 on the barrier structure 33. The light modulation patterns CP_1 include a first wavelength conversion pattern CP1_1, a second wavelength conversion pattern CP2_1, and a light transmission pattern CP3_1.

The metal layer 34_1 may be in the same region as the barrier structure 33. For example, the metal layer 34_1 may be entirely (e.g., substantially entirely) in the modulation area CA and the non-modulation area NCA. A hole pattern HP_1 formed in the barrier structure 33 may be continuously (e.g., substantially continuously) formed in the metal layer 34_1 as well. The light emitted from the LED chips 15 may travel through the hole pattern HP_1 into the respective light modulation patterns CP_1.

Light incident into the light modulation patterns CP_1 may be emitted in a random direction by the first and second wavelength conversion particles WC1 and WC2 or reflected in a random direction by the scattering particles SCT. The metal layer 34_1 arranged to surround the respective light modulation patterns CP_1 may reflect light that does not advance upward in the randomly traveling light, and the reflected light may proceed upward. For example, the metal layer 34_1 may improve the light extraction efficiency of the backlight unit.

Figure 8:
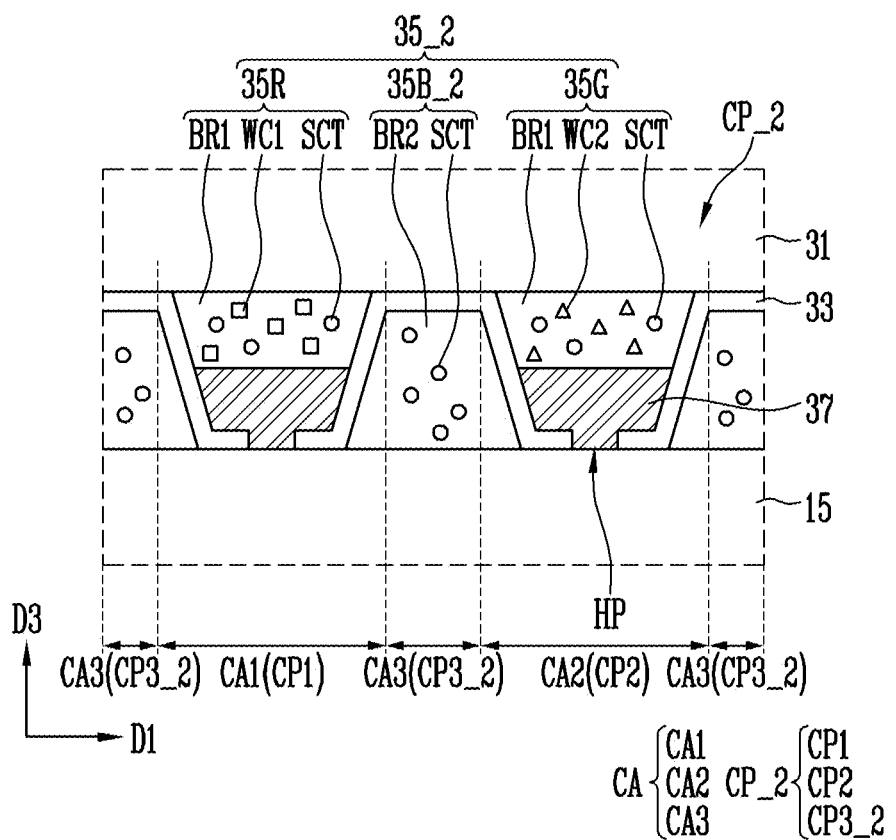

The embodiment of FIG. 8 differs from the embodiment of FIG. 5A in that a light modulation layer 35-2 includes a light transmission layer 35B_2 instead of the air layer 39.

Referring to FIGS. 5A and 8, a light transmission pattern CP3_2 of light modulation patterns CP_2 may be between the first wavelength conversion pattern CP1 and the second wavelength conversion pattern CP2. The light transmission pattern CP3_2 may include a portion of the light transmission layer 35B_2 and the barrier structure 33.

The light transmission pattern CP3_2 may be a scattering layer that scatters incident light similarly to the light transmission pattern CP3 illustrated in FIG. 5A. The light provided from the LED chips 15 may be scattered by the light transmission pattern CP3_2 and emitted to the outside.

The light transmission pattern CP3_2 may include the light transmission layer 35B_2 and the light transmission layer 35B_2 may include a second base resin BR2 and the scattering particles SCT dispersed in the second base resin BR2. In an embodiment, the second base resin BR2 may be made of the same (e.g., substantially the same) material as a first base resin BR1 of the first wavelength conversion layer 35R and the second wavelength conversion layer 35G.

In another embodiment, the second base resin BR2 may include a material having a refractive index lower than that of the first base resin BR1. When the refractive index of the second base resin BR2 is lower than that of the first base resin BR1, the light emitted from the first wavelength conversion pattern CP1 may be totally (e.g., substantially totally) reflected at the boundary between the first wavelength conversion pattern CP1 and the light transmission pattern CP3_2 and proceed upward (for example, in the third direction D3). For example, the light extraction efficiency of the backlight unit can be improved.

The light transmission layer 35B_2 may be between the barrier structure 33 and the LED chips 15. For example, the first wavelength conversion layer 35R and the second wavelength conversion layer 35G may be in the inner space formed by the barrier structure 33 and the second base substrate 31 and the light transmission layer 35B_2 may be in the outer space formed by the barrier structure 33 and the LED chips 15. The light transmission layer 35B_2 may fill the space formed between the barrier structure 33 and the LED chips 15. The light transmission layer 35B_2 may be in contact with the LED chips 15 at least in part, but when a passivation layer is formed on the LED chips 15 according to another embodiment, the light transmission layer 35B_2 may not be in contact with the LED chips 15.

In the structure according to the embodiment of FIG. 8, the first wavelength conversion pattern CP1, the second wavelength conversion pattern CP2, and the light transmission pattern CP3_2 of the light modulation patterns CP_2 may be arranged more densely than the structure according to the embodiment of FIG. 5A. For example, the color conversion efficiency by the light modulation patterns CP_2 of the light provided from the LED chips 15 may be improved. In some embodiments, the light modulation patterns CP_2 do not include a region for transmitting incident light. The light modulation patterns CP_2 scatters light incident on all regions, thereby improving the lateral visibility of the display device.

Figure 9:
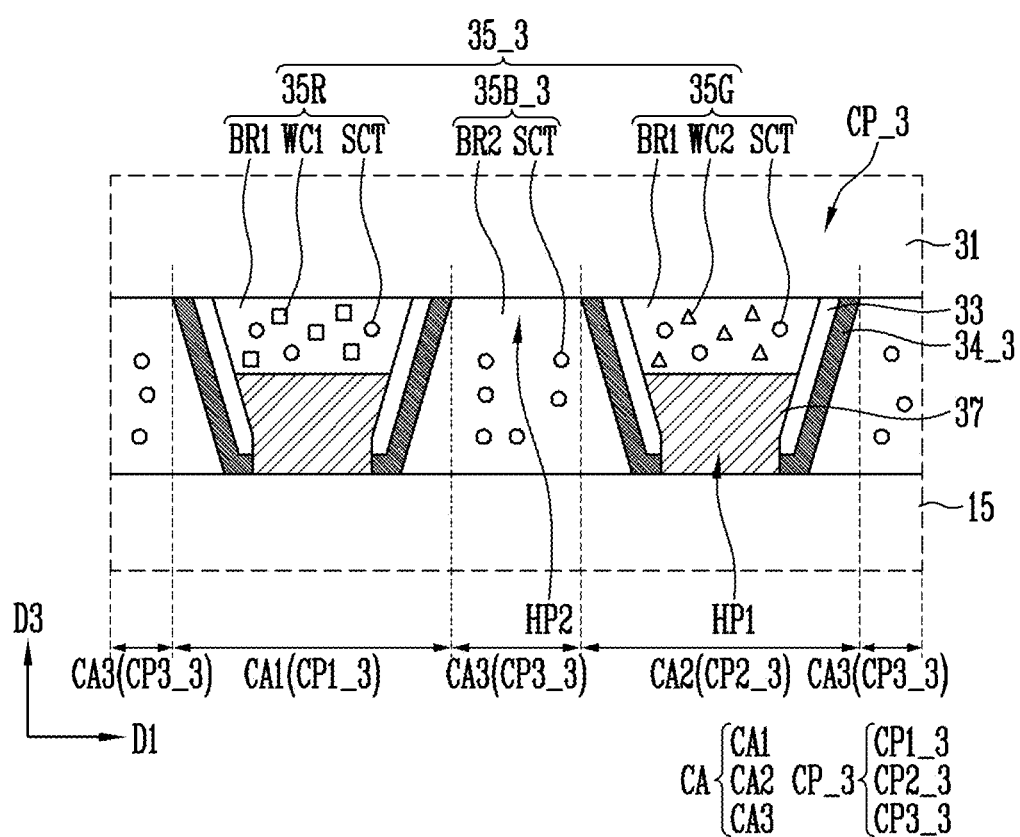

The embodiment of FIG. 9 differs from the embodiment of FIG. 8 in that a light modulation layer 35_3 further includes a metal layer 34_3 on the barrier structure 33.

Referring to FIGS. 8 and 9, light modulation patterns CP_3 may further include the metal layer 34_3 surrounding the outer surface of the barrier structure 33.

The metal layer 34_3 may be located so as to cover the first wavelength conversion layer 35R and the second wavelength conversion layer 35G. The metal layer 34_3 may reflect upward the light emitted in a random direction from the first wavelength conversion layer 35R and the second wavelength conversion layer 35G.

The metal layer 34_3 may be in the first modulation area CA1 and the second modulation area CA2 so as to cover the first wavelength conversion layer 35R and the second wavelength conversion layer 35G. The metal layer 34_3 may not be in the third modulation area CA3.

A first wavelength conversion pattern CP1_3 and a second wavelength conversion pattern CP2_3 may include a first hole pattern HP1. The first hole pattern HP1 may continuously (e.g., substantially continuously) penetrate the barrier structure 33 and the metal layer 34_3. The light emitted from the LED chips 15 may be incident into the first wavelength conversion layer 35R and the second wavelength conversion layer 35G through the first hole pattern HP1.

A light transmission pattern CP3_3 may include a second hole pattern HP2. The second hole pattern HP2 may continuously (e.g., substantially continuously) penetrate the barrier structure 33 and the metal layer 34_3 in the third modulation area CA3. For example, the second hole pattern HP2 may expose at least a portion of the lower surface of the second base substrate 31 and at least a portion of the light transmission pattern CP3_3 may contact the exposed lower surface of the second base substrate 31. The light incident on the light transmission pattern CP3_3 may be emitted to the outside through the second hole pattern HP2.

In the structure according to the embodiment of FIG. 9, the first wavelength conversion pattern CP1_3, the second wavelength conversion pattern CP2_3, and the light transmission pattern CP3_3 are densely arranged as in the structure of the embodiment of FIG. 8, and further, the first wavelength conversion layer 35R and the second wavelength conversion layer 35G are surrounded by the metal layer 34_3, so that the light extraction efficiency of the backlight unit can be improved.

Figure 10:
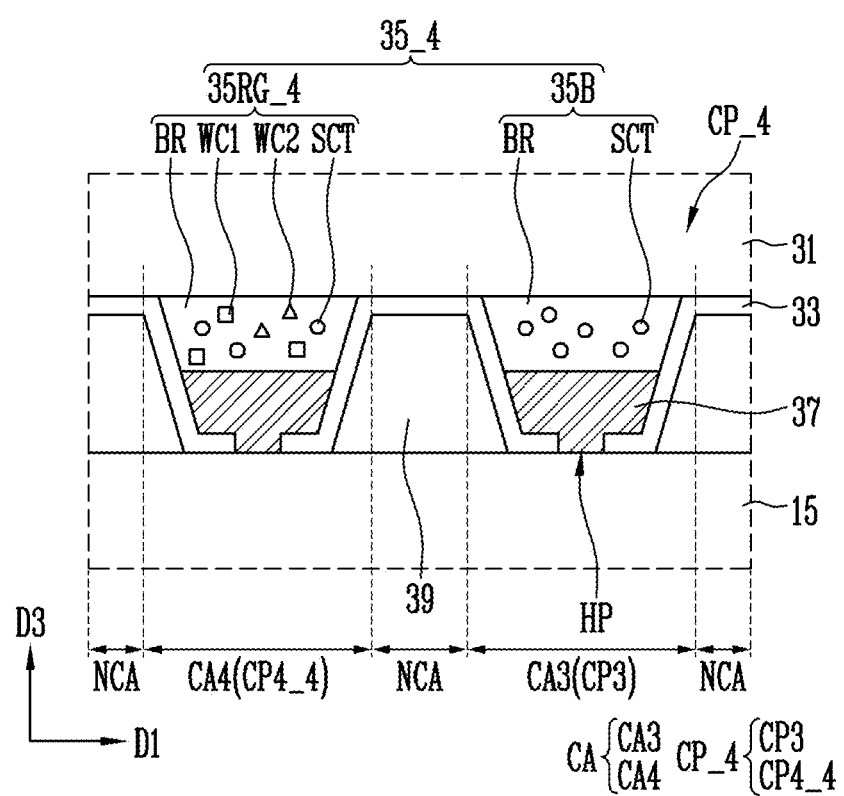

The embodiment of FIG. 10 differs from the embodiment of FIG. 5A in that a light modulation layer 35_4 includes a third wavelength conversion layer 35RG_4 instead of the first wavelength conversion layer 35R and the second wavelength conversion layer 35G.

Referring to FIGS. 5A and 10, the second base substrate 31 may be divided into the modulation area CA and the non-modulation area NCA, and the modulation area CA may include a third modulation area CA3 and a fourth modulation area CA4. In addition, light modulation patterns CP_4 may include the light transmission pattern CP3 in the third modulation area CA3 and a third wavelength conversion pattern CP4_4 in the fourth modulation area CA4.

A third wavelength conversion layer 35RG_4 of the third wavelength conversion pattern CP4_4 may include both the first wavelength conversion particles WC1 and the second wavelength conversion particles WC2. The blue light provided from the LED chips 15 to the third wavelength conversion layer 35RG_4 may be converted into the red light and the green light by the first wavelength conversion particles WC1 and the second wavelength conversion particles WC2, respectively. In the fourth modulation area CA4 in which the third wavelength conversion pattern CP4_4 is arranged, the red light and the green light may be emitted to the outside. Therefore, the light emitted from the fourth modulation area CA4 may be yellow light. According to embodiments, in the fourth modulation area CA4, the blue light that is transmitted without being converted by the first and second wavelength conversion particles WC1 and WC2 may be emitted to the outside. For example, the red light, the green light, and the blue light may be emitted in the fourth modulation area CA4.

FIGS. 11A to 11G are cross-sectional views illustrating a manufacturing method of a backlight unit according to an embodiment, in which a manufacturing method of a color conversion substrate of the backlight unit is mainly shown.

Figure 11A:
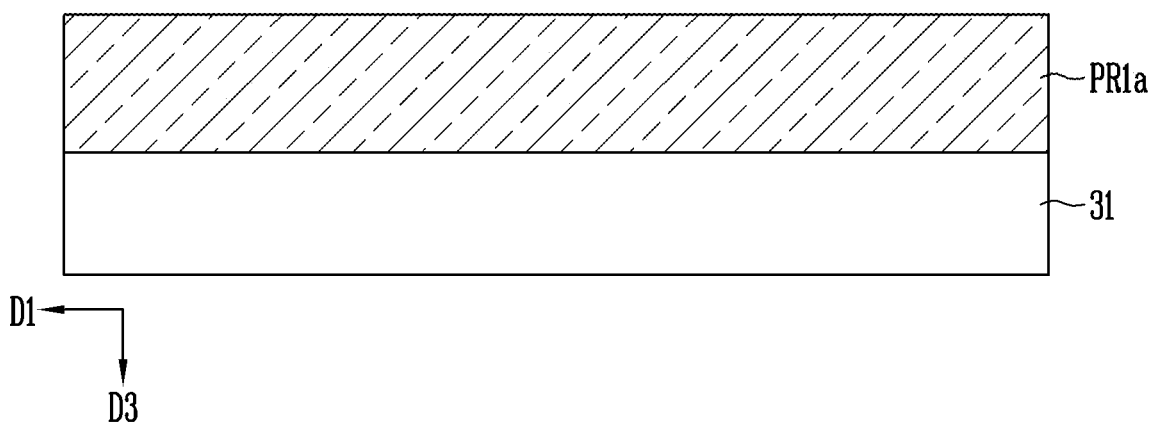
Figure 11B:
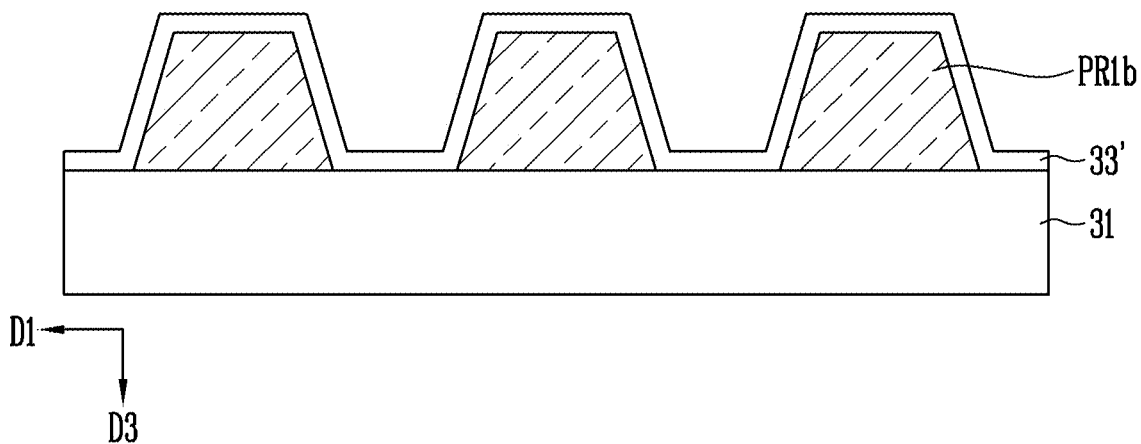

Referring to FIGS. 11A and 11B, a first photoresist PR1*a* may be formed on the second base substrate 31 and then the first photoresist PR1*a* may be patterned through a first mask process to form a first base pattern PR1*b*.

The first photoresist PR1*a* may be a photosensitive organic film and may be formed on the entire (e.g., substantially the entire) upper surface of the second base substrate 31.

The first mask process may be performed using a first mask M1. The first mask M1 may include a first light transmission region M1*a* and a first light blocking region M1*b* and exposure light L_EX may be irradiated to the first photoresist PR1*a* through the first light transmission region M1*a*. For example, the first mask M1 may be a halftone mask or a slit mask in which light transmittance of the first light transmission region M1*a* is gradually changed.

The first photoresist PR1*a* of the portion irradiated with the exposure light L_EX may be removed by a developer and the first photoresist PR1*a* of the portion where the exposure light L_EX is not irradiated may be remained as the first base pattern PR1*b*.

Thereafter, an inorganic material layer 33' may be formed on the first base pattern PR1*b*. The inorganic material layer 33' may be formed entirely (e.g., substantially entirely) on the second base substrate 31 to cover the first base pattern PR1*b*. The inorganic material layer 33' may include any one selected from silicon nitride (SiNx), silicon oxide (SiOx), and silicon oxynitride (SiOxNy), but the present disclosure is not limited thereto. Herein, x and y may be real numbers greater than zero.

Figure 11C:
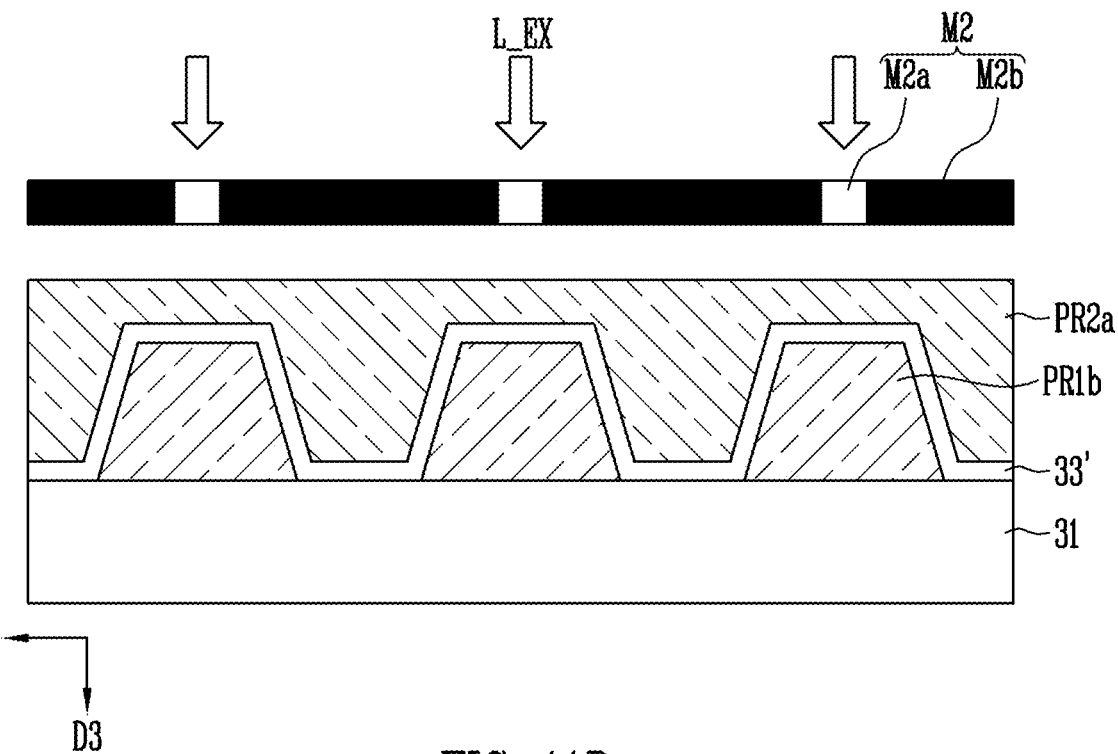
Figure 11D:
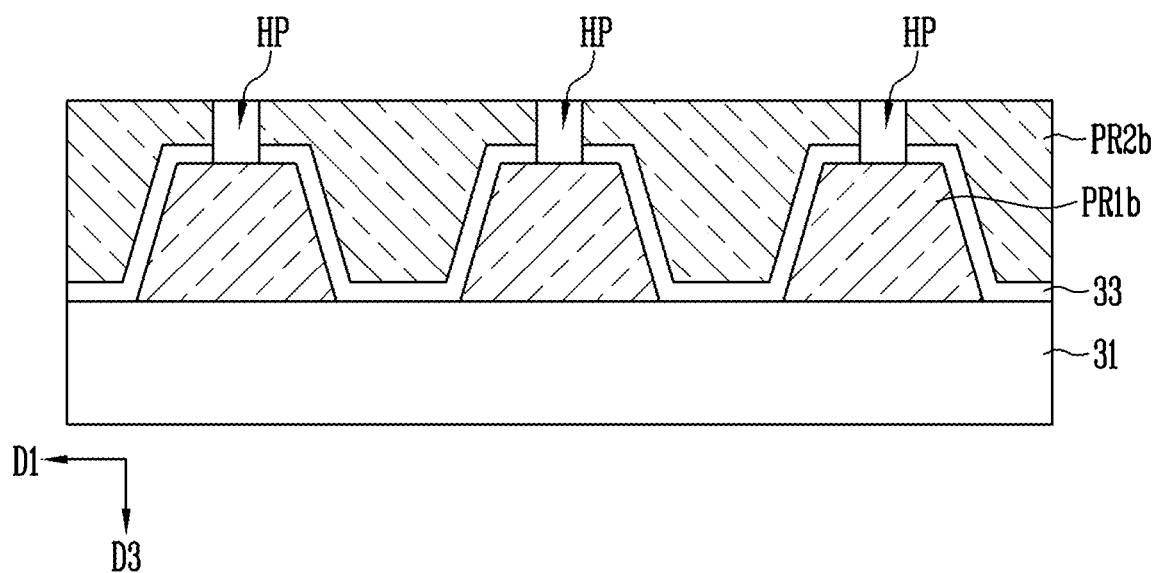
Figure 11E:
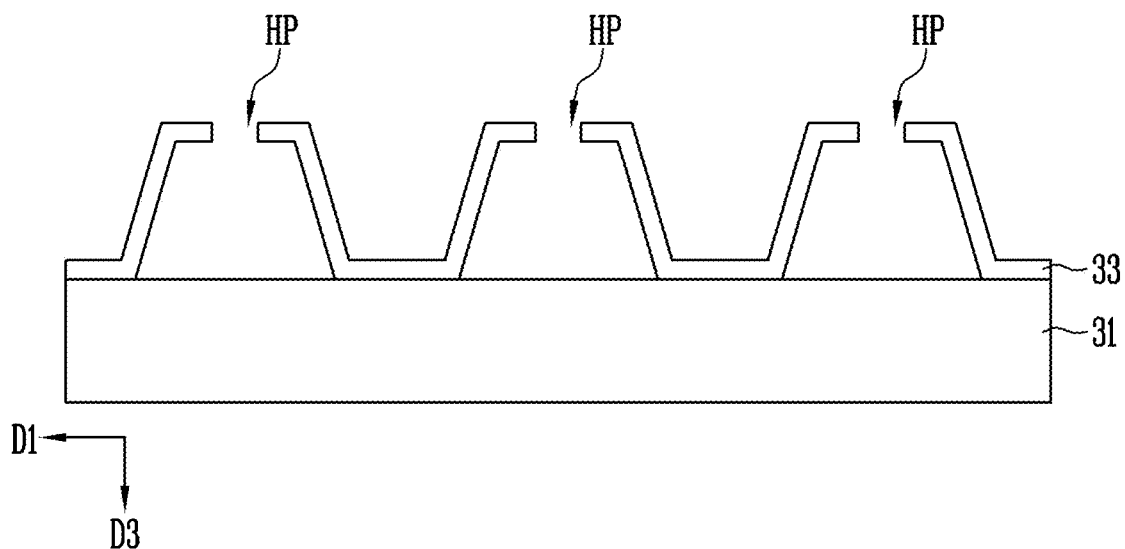
Figure 11F:
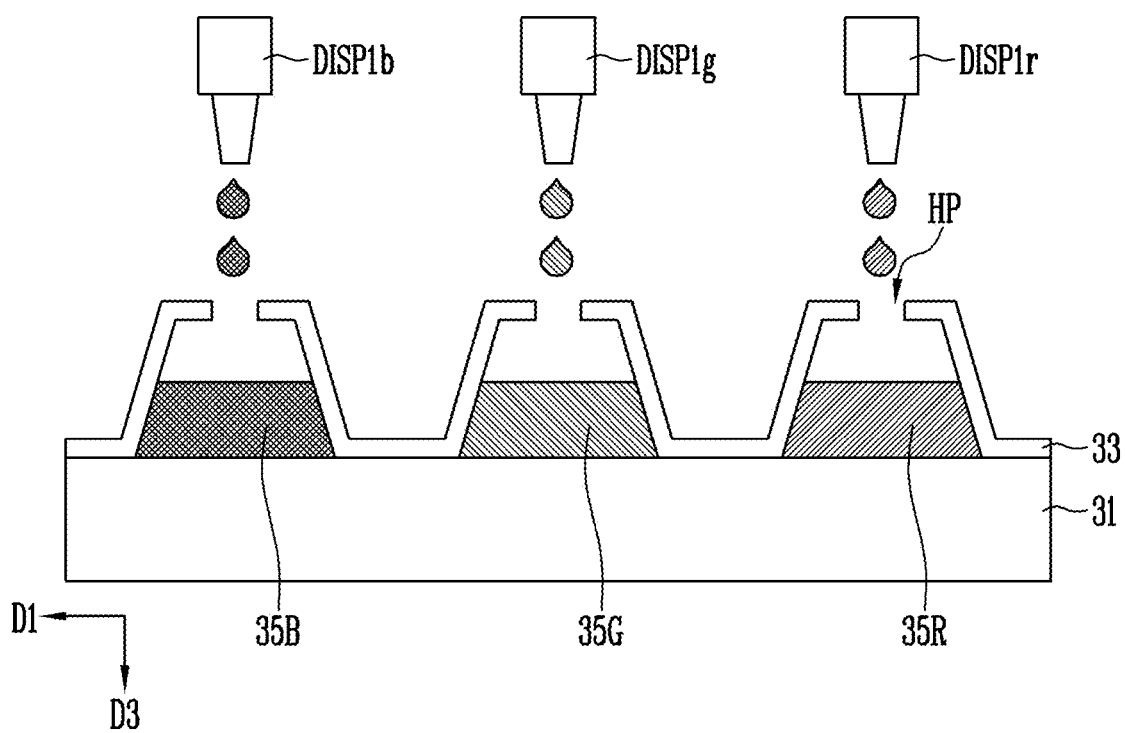

Referring to FIGS. 11C and 11D, a second photoresist PR2*a* may be formed on the second base substrate 31 on which the first base pattern PR1*b* and the inorganic material layer 33' are formed and then the second photoresist PR2*a* may be patterned through a second mask process to form a second base pattern PR2*b*.

The second photoresist PR2*a* may be the photosensitive organic film and may be formed on the entire (e.g., substantially the entire) upper surface of the inorganic material layer 33'.

The second mask process may be performed using a second mask M2. The second mask M2 may include a second light transmission region M2*a* and a second light blocking region M2*b* and the exposure light L_EX may be irradiated to the second photoresist PR2*a* through the second light transmission region M2*a*. The second light transmission region M2*a* may overlap with each first base pattern PR1*b* and may not overlap with the first light transmission region M1*a*.

The second photoresist PR2*a* of the portion irradiated with the exposure light L_EX may be removed by the developer and the second photoresist PR2*a* of the portion where the exposure light L_EX is not irradiated may remain as the second base pattern PR2*b*. The portion irradiated with the exposure light L_EX may be a region where the hole pattern HP to be described herein below is formed.

Thereafter, the hole pattern HP may be formed in the inorganic material layer 33' through an etching process to form the barrier structure 33. At this time, the etching process may be a dry etching process.

Referring to FIGS. 4A, 11E, 11F, and 11G, the first base pattern PR1*b* and the second base pattern PR2*b* may be removed to form the barrier structure 33 on the second base substrate 31 and then the light modulation layers (e.g., the first wavelength conversion layer 35R, the second wavelength conversion layer 35G, and the light transmission layer 35B) and the organic encapsulation layer 37 may be sequentially formed in the barrier structure 33.

The first base pattern PR1*b* and the second base pattern PR2*b* may be removed by the same (e.g., substantially the same) process. However, if the first base pattern PR1*b* and the second base pattern PR2*b* are made of different materials, they can be removed by different processes.

After the first base pattern PR1*b* and the second base pattern PR2*b* are removed, the light modulation layers(e.g., the first wavelength conversion layer 35R, the second wavelength conversion layer 35G, and the light transmission layer 35B) and the organic encapsulation layer 37 may be sequentially formed in the space between the barrier structure 33 and the second base substrate 31.

The light modulation layers (e.g., the first wavelength conversion layer 35R, the second wavelength conversion layer 35G, and the light transmission layer 35B) in the solution state may be ejected from first dispensers DISP1*r*, DISP1*g*, and DISP1*b* by an inkjet printing method. The light modulation layers (e.g., the first wavelength conversion layer 35R, the second wavelength conversion layer 35G, and the light transmission layer 35B) may be injected into the space between the barrier structure 33 and the second base substrate 31 through the hole pattern HP formed in the barrier structure 33.

Various suitable particles (for example, wavelength converting particles and scattering particles) may be dispersed in the solution ejected from the first dispensers DISP1*r*, DISP1*g*, and DISP1*b*.

The shape of the light modulation layers (e.g., the first wavelength conversion layer 35R, the second wavelength conversion layer 35G, and the light transmission layer 35B) may be determined by the shape of the barrier structure 33 and the light modulation layers (e.g., the first wavelength conversion layer 35R, the second wavelength conversion layer 35G, and the light transmission layer 35B) may have a tapered shape like the barrier structure 33 when viewed in section.

The organic encapsulation layer 37 may also be ejected from a second dispenser DISP2 by the inkjet printing method. The organic encapsulation layer 37 may be filled in the space between the barrier structure 33 and the light modulation layers (e.g., the first wavelength conversion layer 35R, the second wavelength conversion layer 35G, and the light transmission layer 35B) through the hole pattern HP. The organic encapsulation layer 37 may fill the remaining space filled with the light modulation layers (e.g., the first wavelength conversion layer 35R, the second wavelength conversion layer 35G, and the light transmission layer 35B). For example, the organic encapsulation layer 37 may be filled up to the hole pattern HP so that the upper surface of the organic encapsulation layer 37 is aligned with the upper surface of the barrier structure 33.

As shown in FIG. 4A, the color conversion substrate 30 fabricated by the above-described process may be combined with the light source substrate 10 to form the backlight unit 100. At this time, the light modulation patterns CP of the color conversion substrate 30 may face the LED chips 15 of the light source substrate 10.

The light modulation patterns CP described herein above may be patterned by the barrier structure 33 and on the second base substrate 31. In this case, because the solution containing the first wavelength conversion particles WC1 and the second wavelength conversion particles WC2 can be arranged in a desired or required shape in a desired or required area, the optical characteristics of the backlight unit can be easily controlled and waste of materials can be reduced. That is, the light efficiency of the display device can be improved and the manufacturing cost can be reduced.

In addition, the height of each of the light modulation patterns CP may be adjusted to a certain level so that the flatness of the color conversion substrate 30 can be improved and the bonding force with the light source substrate 10 can be improved.

The backlight unit according to embodiments of the present disclosure, the display device including the same, and the method of manufacturing the same may form a wavelength conversion material at a desired position according to color characteristics suitable for, or required by, the barrier structure. In addition, waste of materials can be prevented or reduced and the manufacturing cost can be reduced.

According to embodiments of the present disclosure, an organic material layer may be between the LED chips and the wavelength conversion material to prevent or reduce deterioration of the wavelength conversion material due to heat generation of the LED chips. The interval between the light source substrate and the color conversion substrate of the backlight unit can be reduced to achieve the overall slimness of the display device.

The effects according to the embodiments are not limited to the contents exemplified herein above, and more various effects are included in the scope of the present specification.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Embodiments of the present disclosure have been described with reference to the accompanying drawings. However, it will be understood by those skilled in the art that the present disclosure may be embodied in other specific forms without departing from the spirit or essential characteristics thereof. It is therefore to be understood that the above-described embodiments are illustrative in all aspects and not restrictive.

What is claimed is:

1. A backlight unit comprising:
   a first substrate;
   a plurality of LED chips on one surface of the first substrate and configured to emit light of a first color;
   a second substrate located opposite to the one surface of the first substrate; and
   a plurality of light modulation patterns on one surface of the second substrate facing the one surface of the first substrate so as to overlap the plurality of LED chips, respectively,
   wherein each of the plurality of light modulation patterns comprises a first wavelength conversion pattern that converts the light of the first color into light of a second color,
   wherein the first wavelength conversion pattern comprises a first wavelength conversion layer on the one surface of the second substrate, a first organic encapsulation layer on the first wavelength conversion layer, and a barrier structure covering the first wavelength conversion layer and the first organic encapsulation layer, and
   wherein the barrier structure comprises a first hole pattern that exposes at least a portion of the first organic encapsulation layer.

2. The backlight unit of claim 1, wherein each of the plurality of light modulation patterns further comprises a second wavelength conversion pattern that converts the light of the first color into light of a third color and is spaced apart from the first wavelength conversion pattern, wherein the second wavelength conversion pattern comprises a second wavelength conversion layer on the one surface of the second substrate, a second organic encapsulation layer on the second wavelength conversion layer, and the barrier structure covering the second wavelength conversion layer and the second organic encapsulation layer, and wherein the barrier structure comprises the first hole pattern that exposes at least a portion of the second organic encapsulation layer.

3. The backlight unit of claim 2, wherein the first wavelength conversion layer comprises first wavelength conversion particles, the second wavelength conversion layer comprises second wavelength conversion particles, and the first wavelength conversion particles and the second wavelength conversion particles are quantum dots.

4. The backlight unit of claim 2, wherein each of the plurality of light modulation patterns further comprises a light transmission pattern spaced apart from the first wavelength conversion pattern and the second wavelength conversion pattern, wherein the light transmission pattern comprises a light transmission layer on the one surface of the second substrate, a third organic encapsulation layer on the light transmission layer, and the barrier structure covering the light transmission layer and the third organic encapsulation layer, wherein the barrier structure comprises the first hole pattern that exposes at least a portion of the third organic encapsulation layer, and wherein the light transmission layer comprises a base resin and scattering particles dispersed in the base resin.

5. The backlight unit of claim 4, wherein at least one selected from the first wavelength conversion layer and the second wavelength conversion layer further comprises the scattering particles.

6. The backlight unit of claim 2, wherein each of the plurality of light modulation patterns further comprises an air layer between the first wavelength conversion pattern and the second wavelength conversion pattern.

7. The backlight unit of claim 2, wherein each of the plurality of light modulation patterns further comprises a metal layer covering the barrier structure, and wherein the first hole pattern continuously penetrates the barrier structure and the metal layer to expose at least a portion of the first organic encapsulation layer.

8. The backlight unit of claim 7, wherein each of the barrier structure and the metal layer comprises a second hole pattern that exposes at least a portion of the one surface of the second substrate, wherein each of the plurality of light modulation patterns further comprises a light transmission pattern between the first wavelength conversion pattern and the second wavelength conversion pattern, and wherein the light transmission pattern comprises a base resin and scattering particles dispersed in the base resin, and contacts at least a portion of the plurality of LED chips and the one surface of the second substrate exposed through the second hole pattern.

9. The backlight unit of claim 2, wherein each of the plurality of light modulation patterns further comprises a light transmission pattern between the first wavelength conversion pattern and the second wavelength conversion pattern and between the barrier structure and each of the plurality of LED chips, and wherein the light transmission pattern comprises a base resin and scattering particles dispersed in the base resin.

10. The backlight unit of claim 1, wherein the barrier structure comprises a first surface, a second surface and a third surface integrally coupled, and wherein the first surface contacts the one surface of the second substrate, the second surface surrounds a side surface of the first wavelength conversion layer and a side surface of the first organic encapsulation layer, and the third surface comprises the first hole pattern.

11. The backlight unit of claim 10, wherein the barrier structure comprises at least one selected from silicon nitride (SiNx), silicon oxide (SiOx), and silicon oxynitride (SiOxNy).

12. The backlight unit of claim 11, wherein an obtuse angle formed by the one surface of the second substrate with the second surface of the barrier structure is less than 120 degrees.

13. The backlight unit of claim 1, wherein the first wavelength conversion layer comprises first wavelength conversion particles that convert the light of the first color into red light and second wavelength conversion particles that convert the light of the first color into green light.

14. The backlight unit of claim 1, wherein at least a portion of the first organic encapsulation layer is in contact with each of the plurality of LED chips.

15. The backlight unit of claim 1, wherein a gap that overlaps with the first hole pattern is formed between the first organic encapsulation layer and each of the plurality of LED chips.

16. The backlight unit of claim 1, further comprising:
at least one selected from a first passivation layer on the first substrate and covering the plurality of LED chips and a second passivation layer on the second substrate and covering the plurality of light modulation patterns.

17. A display device comprising:
a backlight unit;
a display panel on the backlight unit; and
an optical film between the backlight unit and the display panel,
wherein the backlight unit comprises:
a first substrate;
a plurality of LED chips on one surface of the first substrate and configured to emit light of a first color;
a second substrate located opposite to the one surface of the first substrate; and
a plurality of light modulation patterns on one surface of the second substrate facing the one surface of the first substrate so as to overlap the plurality of LED chips, respectively,
wherein each of the plurality of light modulation patterns comprises a first wavelength conversion pattern that converts the light of the first color into light of a second color,
wherein the first wavelength conversion pattern comprises a first wavelength conversion layer on the one surface of the second substrate, a first organic encapsulation layer on the first wavelength conversion layer, and a barrier structure covering the first wavelength conversion layer and the first organic encapsulation layer, and wherein the barrier structure comprises a hole pattern that exposes at least a portion of the first organic encapsulation layer.

18. The display device of claim 17, wherein each of the plurality of light modulation patterns comprises a second wavelength conversion pattern that converts the light of the first color into light of a third color and is spaced apart from the first wavelength conversion pattern, wherein the second wavelength conversion pattern comprises a second wavelength conversion layer on the one surface of the second substrate, a second organic encapsulation layer on the second wavelength conversion layer, and the barrier structure covering the second wavelength conversion layer and the second organic encapsulation layer, wherein the barrier structure comprises the hole pattern that exposes at least a portion of the second organic encapsulation layer, and wherein the first wavelength conversion layer comprises first wavelength conversion particles, the second wavelength conversion layer comprises second wavelength conversion particles, and the first wavelength conversion particles and the second wavelength conversion particles are quantum dots.

\* \* \* \* \*